United States Patent
Kompalli et al.

(10) Patent No.: US 7,213,227 B2
(45) Date of Patent: *May 1, 2007

(54) RAPID APPLICATION INTEGRATION USING AN INTEGRATED DEVELOPMENT ENVIRONMENT

(75) Inventors: Prasad Kompalli, Bangalore (IN);
Heinz Pauly, Ludwigshafen (DE);
Karl-Heinz Foerg, Schriesheim (DE)

(73) Assignee: SAP Aktiengesellschaft, Walldorf (DE)

(*) Notice: Subject to any disclaimer, the term of this patent is extended or adjusted under 35 U.S.C. 154(b) by 580 days.

This patent is subject to a terminal disclaimer.

(21) Appl. No.: 10/318,356

(22) Filed: Dec. 13, 2002

(65) Prior Publication Data

US 2004/0044985 A1    Mar. 4, 2004

Related U.S. Application Data

(60) Provisional application No. 60/406,637, filed on Aug. 29, 2002, provisional application No. 60/406,643, filed on Aug. 29, 2002, provisional application No. 60/406,631, filed on Aug. 29, 2002.

(51) Int. Cl.
*G06F 9/44* (2006.01)
(52) U.S. Cl. ............................................. 717/108
(58) Field of Classification Search ................ 717/109, 717/113
See application file for complete search history.

(56) References Cited

U.S. PATENT DOCUMENTS

| | | | |
|---|---|---|---|
| 4,714,995 A | 12/1987 | Materna et al. | |
| 5,187,788 A | 2/1993 | Marmelstein | |
| 5,295,222 A | 3/1994 | Wadhwa et al. | |
| 5,634,127 A | 5/1997 | Cloud et al. | |
| 5,721,912 A * | 2/1998 | Stepczyk et al. | ........... 707/102 |
| 5,778,373 A | 7/1998 | Levy et al. | |
| 5,870,605 A | 2/1999 | Bracho et al. | |

(Continued)

FOREIGN PATENT DOCUMENTS

EP    0 592 045    4/1994

(Continued)

OTHER PUBLICATIONS

Y. Zhu et al., "Materializing Web Data for OLAP and DSS", 2000.*

(Continued)

*Primary Examiner*—Meng-Al T. An
*Assistant Examiner*—Trenton Roche
(74) *Attorney, Agent, or Firm*—Fish & Richardson P.C.

(57) ABSTRACT

Techniques are provided to integrate two or more application systems by using an declarative approach that describes functions or rules to be performed to integrate application systems. Particular integration functions are defined that may be useful for common integration activities. Integration functions may be defined for particular objects and may be assembled to form a declarative business process flow. The declarative business process flow identifies the objects to be exchanged between two or more systems, the sequence of particular transformation functions, the physical field to field transformations required, and the physical connection to be established between the systems. An application integration workstation is described that provides a framework and tools to design, develop and modify (or maintain) application integration software. Such an application integration workstation may reduce the time required to construct or maintain application integration software, which may be referred to as "rapid application integration."

32 Claims, 19 Drawing Sheets

U.S. PATENT DOCUMENTS

| | | | |
|---|---|---|---|
| 5,870,765 | A | 2/1999 | Bauer et al. |
| 5,873,096 | A | 2/1999 | Lim et al. |
| 5,909,570 | A | 6/1999 | Webber |
| 5,911,070 | A * | 6/1999 | Solton et al. ............... 717/105 |
| 6,052,684 | A | 4/2000 | Du |
| 6,052,685 | A | 4/2000 | Eastwick et al. |
| 6,212,575 | B1 | 4/2001 | Cleron |
| 6,256,676 | B1 | 7/2001 | Taylor et al. |
| 6,442,748 | B1 | 8/2002 | Bowman-Amuah |
| 6,446,092 | B1 | 9/2002 | Sutter |
| 6,601,234 | B1 | 7/2003 | Bowman-Amuah |
| 7,043,714 | B2 * | 5/2006 | Lin et al. ................... 717/102 |
| 2002/0091680 | A1 * | 7/2002 | Hatzis et al. ................. 707/3 |
| 2002/0095653 | A1 | 7/2002 | Parr et al. |
| 2002/0107752 | A1 | 8/2002 | Rivera et al. |
| 2002/0184610 | A1 * | 12/2002 | Chong et al. ............... 717/109 |
| 2003/0004746 | A1 | 1/2003 | Kheirolomoom |
| 2003/0074648 | A1 | 4/2003 | Brassard |
| 2003/0115572 | A1 * | 6/2003 | Zondervan et al. ......... 717/109 |
| 2003/0135842 | A1 | 7/2003 | Frey |
| 2005/0075949 | A1 | 4/2005 | Uhrig et al. |

FOREIGN PATENT DOCUMENTS

| | | |
|---|---|---|
| EP | 1217515 | 6/2002 |
| WO | WO 93/04436 | 3/1993 |
| WO | WO 00/79408 | 12/2000 |
| WO | WO 01/27806 | 4/2001 |

OTHER PUBLICATIONS

H. Gajewska et al., "Argo: A System for Distributed Collaborations", 1994.*

Durbaon, S.D., et al., Interconnection of Distributed Components: An Overview of Current Middleware Solutions, Journal of Computing and Information Science in Engineering, vol. 1, Mar. 2001, pp. 23-31.

Gray et al., The Dangers of Replication and a Solution, ACM SIGMOD Record, Jun. 1996, pp. 173-182.

Huston et al., Disconnected Operation for AFS, Proceedings of the USENIX Mobile and Location-Independent Computing Symposium, Cambridge, MA, Aug. 2-3, 1993, USENIX Association, pp. 1-10.

Yan Zhu et al., Materializing Web Data for OLAP and DSS, Proc. Of 1$^{st}$ Intl' Conf. on Web-Age Information Management, 2000, pp. 201-214.

Hania Gajewska et al., Argo: A System for Distributed Collaboration, Proc. ACM Multimedia '94, 1994, pp. 433-440.

Douglas C. Schmidt, "Using Design Patterns to Develop Reusable Object-Oriented Communication Software," Oct. 1995, ACM Press, Communications of the ACM, vol. 38, Issue 10, pp. 65-74.

Li Yingjun, et al., "SEIS++: Pattern Language for Seismic Tools Construction and Integration," Dec. 1999, ACM Press, ACM SIGPLAN Notices, vol. 34, Issue 12, pp. 57-66.

* cited by examiner

700

```xml
<?xml version="1.0" encoding="UTF-8" ?>
<md:mapscenario xmlns:md="urn:abc.com:MapBoxMapDefinition"
    xmlns:xsi="http://www.w3.org/2001/XMLSchema-instance"
    xsi:schemaLocation="urn:abc.com:MapBox:MapDefinition
    MapScenario.xsd" name="Test" active="1">
    <md:description>Descriptive text</md:description>
    <md:mapatoms>
        <md:branch name="Branche">
            <md:description>Descriptive text</md:description>
            <md:input id="0" />
            <md:output id="2">null</md:output>
            <md:output id="4">null</md:output>
            <md:output id="6" />
        </md:branch>
        <md:include name="Includer">
            <md:description>Descriptive text</md:description>
            <md:input id="2" />
            <md:output id="3" />
            <md:scenario name="TestI" group="" progDataset=""
                dataDataset="" />
        </md:include>
        <md:xform name="SimpleXForm">
            <md:description />
            <md:input id="4" />
            <md:output id="5" />
            <md:rule>
                <xsl:stylesheet
                    xmlns:xsl="http://www.abc.com/XSL/Transform"
                    >transform</xsl:stylesheet>
            </md:rule>
        </md:xform>
        <md:unbranch name="Branche2">
            <md:description>Urps</md:description>
            <md:input id="3" />
            <md:input id="5" />
            <md:input id="6" />
            <md:output id="0" />
        </md:unbranch>
    </md:mapatoms>
    <md:converter className="mapbox.mapscenario" />
    <md:converter className="java.lang.String" />
    <md:converter className="com.Dumm" />
</md:mapscenario>
```

FIG. 12

```xml
<?xml version="1.0" encoding="UTF-8" ?>
<md:xform xmlns:md="urn:abc.com:MapBox:MapDefinition"
    name="name text"
    xmlns:xsi="http://www.w3.org/2001/XMLSchema-instance"
    xsi:schemaLocation="urn:abc.com:MapBox:MapDefinition
    Xform_Def.xsd">
    <md:description>descriptive text</md:description>
<md:input id="12" />
<md:output id="14" />

<md:rule>
    <xsl:stylesheet
        xmlns:xsl="http://www.w3.org/1999/XSL/Transform" />
</md:rule>
</md:xform>
```

FIG. 13

```
<?xml version="1.0" encoding="UTF-8" ?>
<md:split xmlns:md="urn:abc.com:MapBox:MapDefinition"
    name="name" xmlns:xsi="http://www.w3.org/2001/XMLSchema-
    instance" xsi:schemaLocation="urn:abc.com:MapBox:MapDefinition
    Split_Def.xsd">
    <md:description>Descriptive text</md:description>
<md:input id="12" />
<md:output id="14">/an/xpath/expression</md:output>
</md:split>
```

```
<?xml version="1.0" encoding="UTF-8" ?>
<md:branch xmlns:md="urn:abc.com:MapBox:MapDefinition"
    name="text" xmlns:xsi="http://www.w3.org/2001/XMLSchema-
    instance" xsi:schemaLocation="urn:abc.com:MapBox:MapDefinition
    Branch_Def.xsd">
    <md:description>Descriptive text</md:description>
<md:input id="12" />
<md:output id="14">/an/xpath/expression</md:output>
<md:output id="15">/another/xpath/expression</md:output>
<md:output id="7" />
</md:branch>
```

FIG. 15

```xml
<?xml version="1.0" encoding="UTF-8" ?>
<md:validate xmlns:md="urn:abc.com:MapBox:MapDefinition"
    name="henry" xmlns:xsi="http://www.w3.org/2001/XMLSchema-
    instance" xsi:schemaLocation="urn:abc.com:MapBox:MapDefinition
    Validate_Def.xsd">
    <md:description>descriptive text</md:description>

<md:input id="12" />
<md:output id="14" />
<md:output id="15" />

<md:schema>
    <md:ref name="text" group="" progDataset="" />
</md:schema>
</md:validate>
```

FIG. 16

RAPID APPLICATION INTEGRATION USING AN INTEGRATED DEVELOPMENT ENVIRONMENT

CROSS REFERENCE TO RELATED APPLICATIONS

This application claims priority from U.S. Provisional Application No. 60/406,637, filed Aug. 29, 2002, and titled "Rapid Application Integration," U.S. Provisional Application No. 60/406,643, filed Aug. 29, 2002, and titled "Rapid Application Integration Using Functional Atoms," and from U.S. Provisional Application No. 60/406,631, filed Aug. 29, 2002, and titled "Isolated Mapping Point," all of which are incorporated by reference.

TECHNICAL FIELD

This description relates to techniques for exchanging data between two or more computer systems.

BACKGROUND

A database, such as a relational database, an object-oriented database, or another type of data management system, may be used for the administration of data processed by a computer system running one or more application programs or systems. Examples of application programs or systems include an enterprise resource management system, a customer relationship management system, a human resources management system, a supply chain management system, and a financial management system. Data from one data management system used for one application system may need to be sent to one or more data management systems for storage and use by other application systems. The transfer of data from one data management system to another data management system may be referred to as a data exchange. When two data management systems or application systems need to exchange data on a routine basis, the development of a data exchange capability may be referred to as the integration of the application systems.

The development of data exchange capabilities between two application systems may involve the design, coding and testing of software designed for exchanging data between the particular data management systems. Such software may be referred to as application integration software. Application integration software may be developed through manual design and programming of the software with little or no use of design and programming tools. Manually designing and programming software for integrating application systems may be an impractical method to integrate disparate application systems, particularly when a number of disparate application systems must be integrated or application systems must be integrated rapidly.

An alternative to manually designing and programming application integration software is to use a code generation program, such as a CASE ("computer-aided software engineering" or "computer-aided systems engineering") tool, to integrate application systems. In general, CASE tools may provide automated support for the process of designing and programming software (for example, producing source code and/or executable instructions). CASE tools may employ a visual design interface that permits a user to diagram the procedural and data elements required and how the elements are related to or used in the software.

One type of automated support for computer system integration is a graphical user interface that may be used for creating a specification for data management system integration. The specification describes a workflow that relates a series of executable communication scripts and data translators that are used to integrate two computer systems. An executable communication script may be based on a generalization of a particular interactive session that establishes a connection between the two computer systems and exchanges data between two data management systems. A data translator identifies the data fields to be sent from one system to the other system and a translation rule for each data field. An example translation rule may be to delete trailing blanks at the end of a data value of a particular data field before sending the data value to the other system.

SUMMARY

Techniques are provided to integrate two or more application systems by using a declarative approach to application integration. Application integration refers to the connection of two or more systems through data exchange. Application integration may occur, for example, when a new system is installed, a new version of system installed, or a system with which the application communicates is changed. Application integration may represent a significant portion of the cost of owning and operating an application system (which may be referred to as the total cost of ownership). The reduction of the time needed to design and implement application integration software needed to translate data from one system and/or data format to another system and/or data format may improve application integration.

Application integration may use a declarative approach to integration. In general, a declarative approach describes the functions or rules to be performed to produce a result. In contrast, a procedural approach specifies the explicit sequence of steps to follow to produce a result. A declarative approach for application integration uses reusable patterns to declare the rules used and the functions performed in application integration software.

A reusable pattern may be a functional atom that represents a unit of integration that is performed either completely or not at all in application integration software. Examples of reusable patterns that are functional atoms include data processing functions, such as the transformation of data according to a set of transformation rules, separating data from a single document, segment, or record into different documents, segments, or records, joining data from more than one document, segment or record to a single document, segment or record. Additional functional atoms include reading from and writing to a data store, initiating a particular process, or applying a set of validating rules to a data set.

A reusable pattern also may be a collection of functional atoms. One or more functional atoms may be collected, for example, in a library of integration functions. A reusable pattern accessible from a library (or other type of collection or group) of integration functions may be referred to as an integration design pattern.

One or more functional atoms also may be collected to form a map scenario that represents an integration function to be performed by the application integration software. A map scenario may include one or more other map scenarios. Through the use of a stack approach of including (or nesting) one or more map scenarios within another map scenario, the integration functions to be performed be the application integration software may be represented.

Reusable patterns (such as one or more functional atoms, integration design patterns, or map scenarios) may be defined for integration functions that commonly occur when integrating two application systems. For example, a map scenario may be defined for the bulk transfer of data between two systems, error checking associated with received data, or data transformation functions, such as transforming data identifiers from a proprietary identifier format to a global unique identifier format.

An application integration workstation may leverage a declarative approach to integration by providing a framework and tools to design, develop and modify (or maintain) application integration software. The application integration workstation may be an integrated development environment (IDE) that tightly couples a visual tool for declaring rules and functions for the integration application software with the reusable patterns, such as a functional atom or integration design pattern, used in the integration application software. For example, a particular element displayed by the visual tool may be associated with one or more reusable patterns and/or a particular portion of application integration software. A user of the application integration workstation may display the reusable patterns (or portion of application integration software) associated with a displayed element in the visual tool by selecting the displayed element or may display the displayed element in the visual tool associated with a reusable pattern (or portion of application integration software) by selecting the reusable pattern (or portion of application integration software).

The use of a declarative approach may reduce the time required to construct or maintain application integration software, which may be referred to as "rapid application integration." For example, the time required to construct or maintain application integration software may be reduced when the functions performed by the application integration software are made more visible to the application integration software developer through the use of reusable patterns. A developer may be able to better comprehend the functions performed by the application integration software when reusable patterns are used. The reusable patterns may provide one or more additional layers of abstraction that aid the developer's comprehension.

Application integration also may use an isolated mapping point that is a computer system, a server, or other computing device that includes a mapping database and performs mapping functions. An isolated mapping point receives data from the sending system, transforms the data as necessary, and sends the transformed data to the receiving system. The isolated mapping point performs the data transformation without accessing data or processes on the sending system or the receiving system. The isolated mapping point is separate (or isolated) from both the sending system and the receiving system. The isolated mapping point uses only data included in the mapping database or received through a well-defined interface (for example, data sent in, or along with, a mapping request from the sending system).

By including a mapping database, the isolated mapping point may avoid the need to access any application-specific data for performing the data translations (and hence the name isolated mapping point). The isolated mapping point also may be referred to as an isolated mapping point because the isolated mapping point replaces the use of invisible, undocumented interfaces for data translations and isolates the data translation (or mapping) from one system to another system in the single access point.

The isolated mapping point also may be used to provide a common document object that is a data model of data used by different application programs in a standard format. By communicating using the common document object, the number of interfaces that need to be developed to exchange data in a network of computer systems may be reduced.

Through the use of an isolated mapping point, the integration of application systems may be decoupled (or separated) from the technical methods of communication and the application systems being integrated. This may improve the ability to substitute one application system with another application system in a heterogeneous landscape of application systems that need to be integrated. For example, an application system that has been previously integrated with another application system may have to be replaced. When the application integration software does not use the application system to be replaced to provide the transformation rules or data for any data transformation needed in the integration, the application system may be more quickly and easily replaced because the application system may be replaced without developing transformation rules or new data access programs that previously had been performed by the application system to be replaced.

An isolated mapping point may be developed using conventional procedural integration programming or other conventional software engineering techniques. For example, application integration software may be developed without the use of CASE tools or other code generation tools.

Alternatively, an isolated mapping point may be developed using a declarative approach. The benefits of rapid application integration (such as the greatest reduction of cost associated with integrating applications and/or a substantial reduction in the amount of time required to integrate applications) may be increased when both a declarative approach and an isolated mapping point are used to integrate application systems. For example, an isolated mapping point may use a declarative approach that increases the efficiency of the isolated mapping point.

To fully understand the techniques presented in this description, the challenges and issues of application integration need to be fully understood. Data management systems, such as a relational database, an object-oriented database, or another type of data management system, are widely used for administration of data which are processing by application programs or systems running on computer systems. In a relational database, the data form a large number of two-dimensional tables, which describe a relationship. A table may, for example, relate to an object and to data which can be uniquely associated with the object. For example, the customer data of a company may be stored in a "customer" table whose columns relate to different customer attributes (for example, company name, billing address, contact information). The values for different customers form the rows in the table. The tables contained in relational databases relate not only to objects but also to relationships between objects. For example, when an order for a specific customer is processed, the "order" table that is generated for the administration of orders contains a "for customer" attribute that is used to define the customer-order relationship (for example, identifies the customer to which the order applies). Such attributes (which may be implemented by the use of pointers from one object to another in the database) play a major role for representing relationships between objects that are described by different tables in a database.

Data stored by different data management systems may use different data models that require data to be transformed (or converted or translated) to a different data structure before the data can be accepted or used by the other system.

To accomplish data exchange between two heterogeneous data management systems, data structures in a data management system may be mapped onto one another. In addition, the data contents need to be matched appropriately (for example, the object "customer" in one system corresponds to "buyer" in another system). For example, one data management system may store data values representing a particular attribute using a different field type and length as that used by a different data management system. A data management system may use different data codes than another data management system. For example, one system may store a country value using a numeric code (for example, a "1" for the United States and a "2" for the United Kingdom) whereas another system may store a country value as a textual abbreviation (for example, "U.S." for the United States and "U.K." for the United Kingdom). The country codes in the two systems may be identified as representing the same attribute and then a translation table made available that translates the various possible values from one system to another system (for example, "1" to "U.S." and "2" to "U.K.").

Data stored by different data management systems also may use different primary key structures to uniquely identify a particular data object. For example, one system may use a proprietary key numbering system in which primary keys are created by sequentially allocating numbers within an allocated number range. Another system may use a GUID ("globally unique identifier" or "global unified identifier") key that may be created based on a combination of a few unique settings based on specific point in time (for example, an Internet Protocol address, a device MAC (Media Access Control) address, and clock date and time). In order to accurately exchange data, the key values may need to be mapped from one system to another system.

Data stored by different data management systems also may use different data management system types. For example, data may be stored by a relational database in one system and stored as an XML ("Extensible Mark-up Language") document in another system. XML is a language similar to hypertext markup language (HTML) but with the additional flexibility of being able to describe data structures that can be processed directly as data by a program. The data formats used to exchange data need to use a format that is able to be used by the receiving data management system.

These data mapping complexities complicate the data exchange between systems that need to be integrated. Often data mapping transformations are accomplished using application-specific code that may be hidden from the data transformation interface. When the application-specific code is modified, the data exchange program that uses the application-specific code may malfunction.

Data exchange also may be complicated by the number of different systems with which a particular system needs to be integrated. Often data may need to be exchanged with a network of interconnected computer systems, some of which may be owned and operated by the same corporate entity and some of which may be owned and operated by different legal entities. For example, a customer relationship management system used for entering customer orders may need to be integrated with an order processing system used to process each entered order, a financial management system used for financial reporting, and multiple suppliers with whom one or more orders are placed. Each supplier typically is a different corporate entity than the company that places the order.

In addition, data exchange software may need to be modified when any one of the systems is modified or replaced. For example, a supplier or other business partner may be changed and data exchange software may have to be developed for the new supplier or other business partner. Often data exchange software may need to be developed under strict time constraints, such as when a supplier is replaced with a new supplier. The time and costs associated with developing and maintaining data exchange software may be a significant portion of the total cost of ownership of a particular application program or system.

Data exchange also may be complicated when data enhancement (or enrichment) needs to occur when data is exchanged with another system. For example, application systems that operate on portable computing devices (such as a personal digital assistant or laptop computer) may have fewer data fields than corresponding data fields on another system that receives data from the application system on the portable computing device. Data may not be accepted by the other system without adding data fields that are required by the receiving application system. For example, the application system on the portable computing device may not include data fields that are mandatory on the receiving application system. For data to be accepted by the receiving application system, the mandatory data must be entered, for example, by adding default data values that are added or adding data values applicable to the particular record.

In another aspect, a method for designing application integration software may use reusable patterns from a repository to perform a specified data transform between different specified application software systems. The method includes specifying a service connection over which the specified data transfer is to occur, in response to receiving at a computer workstation a user input. The user input selects, from a repository accessible by the workstation that identifies a landscape of possible application software systems that may be selected, the different application software systems involved in the specified data transfer. The user input also associates the selected application software system with one another through the service connection of one of the different application software systems involved.

The method also includes specifying an integration design that accomplishes the specified data transfer and that is made up of at least one integration design pattern, in response to receiving a user input. The user input selects, from a repository that identifies various standard processes used in data transfers, the integration design patterns needed to accomplish the specified data transfer. The user input also specifies the sequence by which the selected integration design patterns are to be performed.

The method may generate software code that controls the specified data transfer from the specified integration design via the specified service connection. The method may associate at least one portion of the generated software code with at least one portion of the integrated design. A second user input that identifies a portion of the integration design to be displayed may be received. The portion of the generated software code that is associated with the portion of the identified integration design is displayed. The displayed portion of the generated software code may be modified. The generated software code may be executable instructions or may be a generated template for integration software.

Examples of integration design patterns include a pattern for validating a data collection for mandatory information, a pattern for splitting data from one data collection into separate data collections, a pattern for invoking a key mapping function, a pattern for invoking a data transformation function, a pattern for invoking a connectivity function for a particular application system, and a pattern for invoking a connectivity function for invoking a particular service.

An integration design pattern may decompose into two or more integration design patterns.

A reusable pattern may be referred to as a functional atom and represents a unit of integration that is performed completely during a data exchange. Examples of functional atoms include a data processing functional atom, a data persistency functional atom, or a helper functional atom. Other examples of functional atoms include a call atom that initiates the execution of a program module or other type of executable software, and an include atom that starts the execution of a second functional atom.

More specific examples of functional atoms include a transformation functional atom, a branch functional atom, an unbranch functional atom, a split functional atom, and a join functional atom. A transformation functional atom may receive a data collection and a data transformation rule, may transform the received data collection by applying the data transformation rule to the received data collection, and may produce a transformed data collection. The data transformation rule may include multiple transformation components. A branch function atom may receive a data collection, may transform the received data collection based on data values within the received data collection, and may produce at least one data collection based on the received data collection. An unbranch functional atom may receive at least one data collection and may produce a data collection based on the data collection received. A split functional atom may receive a data collection, may transform the received data collection based on repeating data within the received data collection, and may produce at least one data collection based on the received data collection. A join functional atom may receive at least the data collection with each data collection including a particular type of data, and may produce at least one data collection based on the data collections received. A functional atom may include a validate functional atom. A validation functional atom may receive a data collection and a data validation rule, may validate the received data collection by applying the data validation rule to the received data collection, and may produce a validation result. The validation rule may include multiple validation components.

Implementations of the techniques discussed above may include a method or process, an apparatus or system, or computer software on a computer-accessible medium. The details of one or more of the implementations are set forth in the accompanying drawings and description below. Other features will be apparent from the description and drawings, and from the claims.

DESCRIPTION OF THE DRAWINGS

FIG. 12 is a example of an XML representation of a map scenario.

FIGS. 13–16 are examples of XML representations of functional atoms.

Like reference symbols in the various drawings indicate like elements.

DETAILED DESCRIPTION

Figure 1:
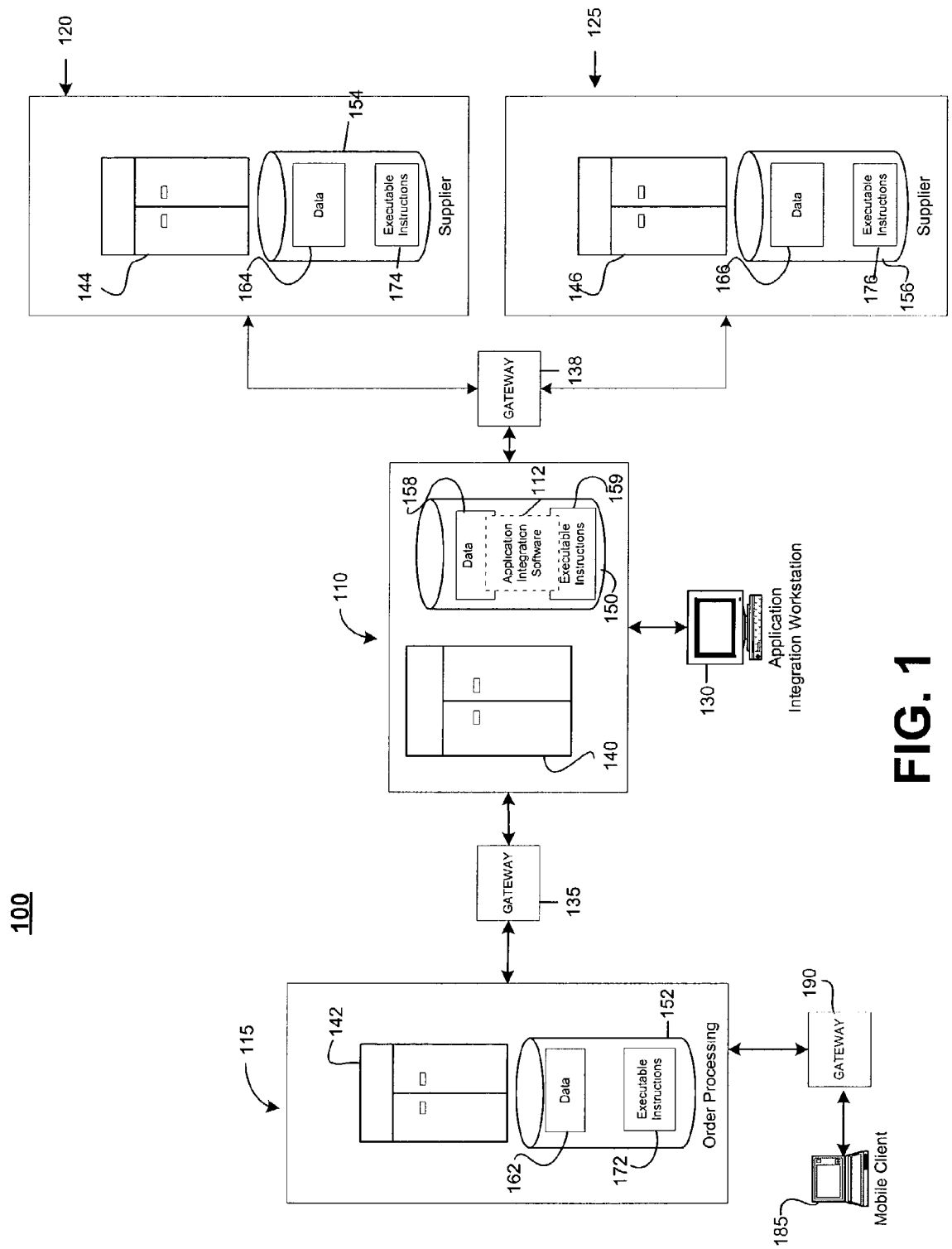
FIG. 1 is a diagram of a network of systems that exchange data using application integration software developed using an application integration workstation.

FIG. 1 shows a network of systems 100 in which a computer system 110 exchanges data with computer systems 115, 120, and 125. The computer system 110 uses application integration software 112 to direct the data exchange with computer systems 115, 120, and 125. An application integration workstation 130 is used to develop and maintain the application integration software 112. The computer system 110 is capable of delivering and exchanging data with computer system 115 through communication gateway 135. The computer system 110 is capable of delivering and exchanging data with computer systems 120 and 125 through communication gateway 138. As is conventional, each computer system 110, 115, 120 or 125 includes a server 140, 142, 144, or 146 and a data storage device 150, 152, 154, or 156 associated with each server. Data storage device 150 includes data 158 and executable instructions 159 for the application integration software 112 on computer system 110. Each of the data storage devices 152, 154, and 156 includes data 162, 164, or 166 and executable instructions 172, 174, or 176 for data exchange software and/or one or more application systems on computer system 115, 120, or 125.

The application integration workstation 130 provides automated support to a user in the design, development (or construction) and maintenance of the application integration software 112 on computer system 110. The computer system 110 and application integration workstation 130 may be arranged to operate within or in concert with one or more other systems, such as, for example, one or more LANs ("Local Area Networks") and/or one or more WANs ("Wide Area Networks"). The application integration workstation 130 may be a general-purpose computer that is capable of operating as application integration workstation (for example, a desktop personal computer, a workstation, or a laptop computer running an application program), or a more special-purpose computer (for example, a device specifically programmed to operate as an application integration workstation).

The application system on computer system 115, in this example, is an order processing application that receives orders entered through a mobile client 185 that connects to computer system 115 through gateway 190. The mobile client 185 may be a general-purpose computer, such as a laptop, a special-purpose computer, or another mobile computing device, such as a personal digital assistant ("PDA") or a portable personal communicator. A mobile client 185 provides a user of the mobile client with functions and data to enter orders placed by customers. The mobile client 185 stores the executable instructions and data used by the mobile client user.

Communication gateways 135, 140 and 190 may each connect mobile client 185 or computer systems 110, 115, 120, or 125 to the Internet, the World Wide Web (web), WANs, LANs, analog or digital wired and wireless telephone networks, satellite, and/or any other delivery mechanism for carrying data. Communication gateways 135, 140 and 190 may connect through, for example, a wired, wireless, cable, or satellite communication pathway.

Computer system 115 sends order data to computer system 110 through communication gateway 135. The computer system 110 uses application integration software 112 to translate the received order data into a supplier order data message that is sent to computer system 120. The supplier order data sent to computer system 120 is the data in the format required by a supplier order processing application system on computer 120. Similarly, computer system 110 uses application integration software 112 to translate the received order data into a second supplier order data message that is sent to computer system 125. The supplier order data sent to computer system 120 is the data in the format required by a supplier order processing application system on computer 125.

The computer system 110 distributes the messages using communication gateway 138 to the supplier order processing application system operating on computer system 120 and the supplier order processing application system operating on computer system 125. The orders then are available for processing by the supplier applications operating on computer systems 120 and 125.

Figure 2:
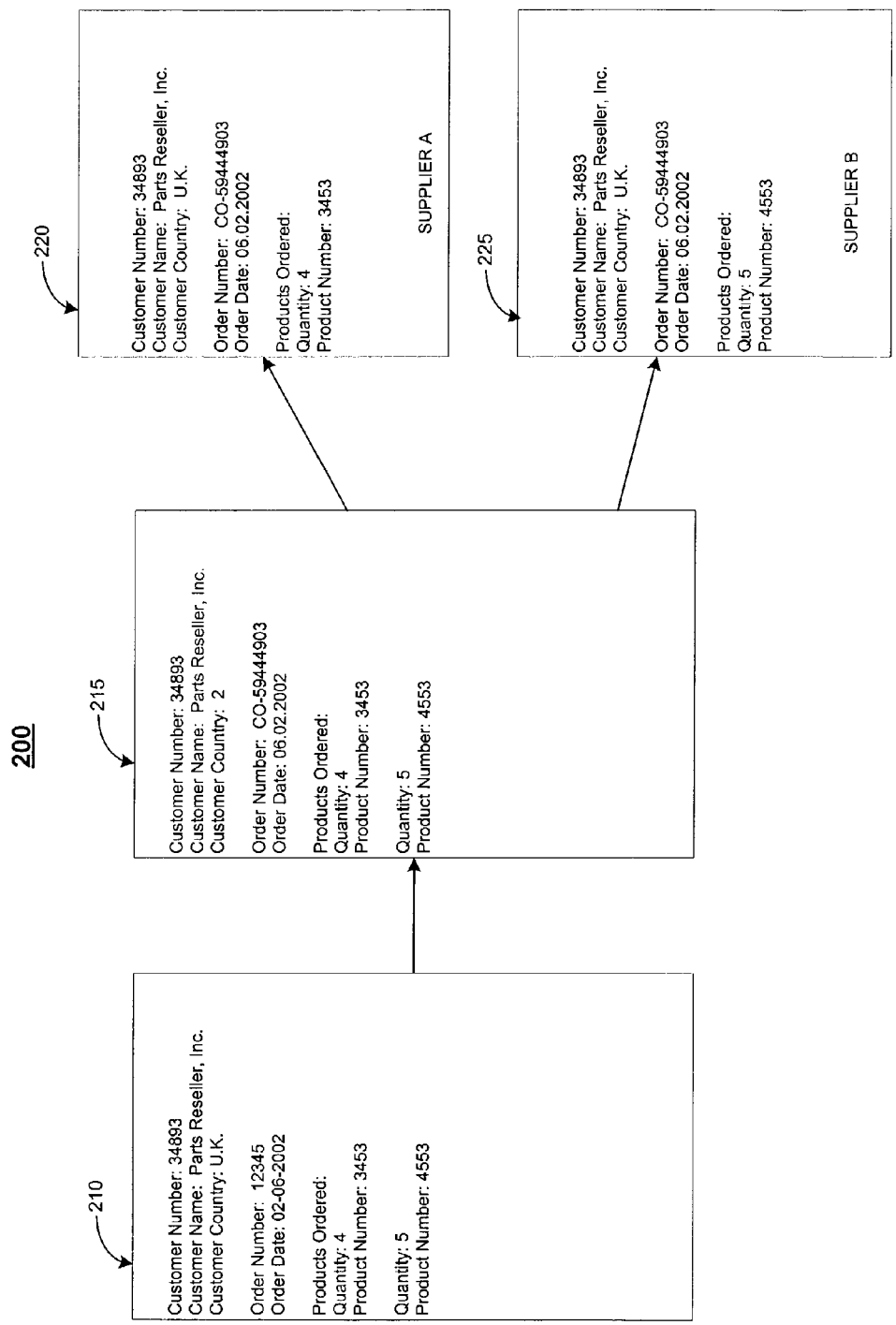
FIG. 2 is a diagram illustrating the results of data transforms performed by application integration software designed, developed and maintained by an application integration workstation.

FIG. 2 illustrates the results 200 of data transformations performed by application integration software designed, developed, and maintained by an application integration workstation. The application integration software may be, for example, the application integration software 112 in FIG. 1 developed using application integration workstation 130 in FIG. 1.

Order data 210 represents customer order data as entered by a user and stored as a customer order in a customer order processing system. For example, order data 210 may have been entered by a user of mobile client 185 in FIG. 1 and stored on computer system 115. Order data 210 includes data values for customer number, customer name, customer country, order number, order date, and products ordered. The products includes a data value for the quantity ordered for product number. The products ordered also includes a data value for the quantity ordered for product number.

Order data 215 represents order data as transformed by the application integration software. The order data 215 includes values (though not necessarily the same values) as the order data fields in order data 210. The application integration software that received order data 210 transformed particular data values based on executable instructions and data included in the application software. The received order number was transformed to a different value as shown by order data. The application integration software may have used a key mapping function to translate the key value order number to a different representation used by order data 215. The format of order date in order data 210 is transformed to a different representation as shown by order date in order data 215. For example, application integration software may have used a date format translation to transform the order date into order date. The value for customer country in order 215 was modified from the customer country value in order 210. For example, a customer country data translation table may have been used to translate the text value "U.K." used in order data 210 to the numeric value "2" used in order data 215.

The application integration software replicated order data 215 and modified each copy of order data 215 to create order data 220 or 225. Order data 220 was modified to include the appropriate data in a format usable by a first supplier from whom one of the ordered products is purchased. Order data 225 was modified to include the appropriate data in a format usable by a second supplier from whom the second ordered product is purchased. Order data 220 is sent to the first supplier. Order data 225 is sent to the second supplier. Specifically, the application integration software produces order data 220 that includes only the data necessary to place an order with a first supplier for one product in order data 210. Order data 225 contains only the data necessary to place an order with a second supplier for the other product in order data 210.

Figure 3:
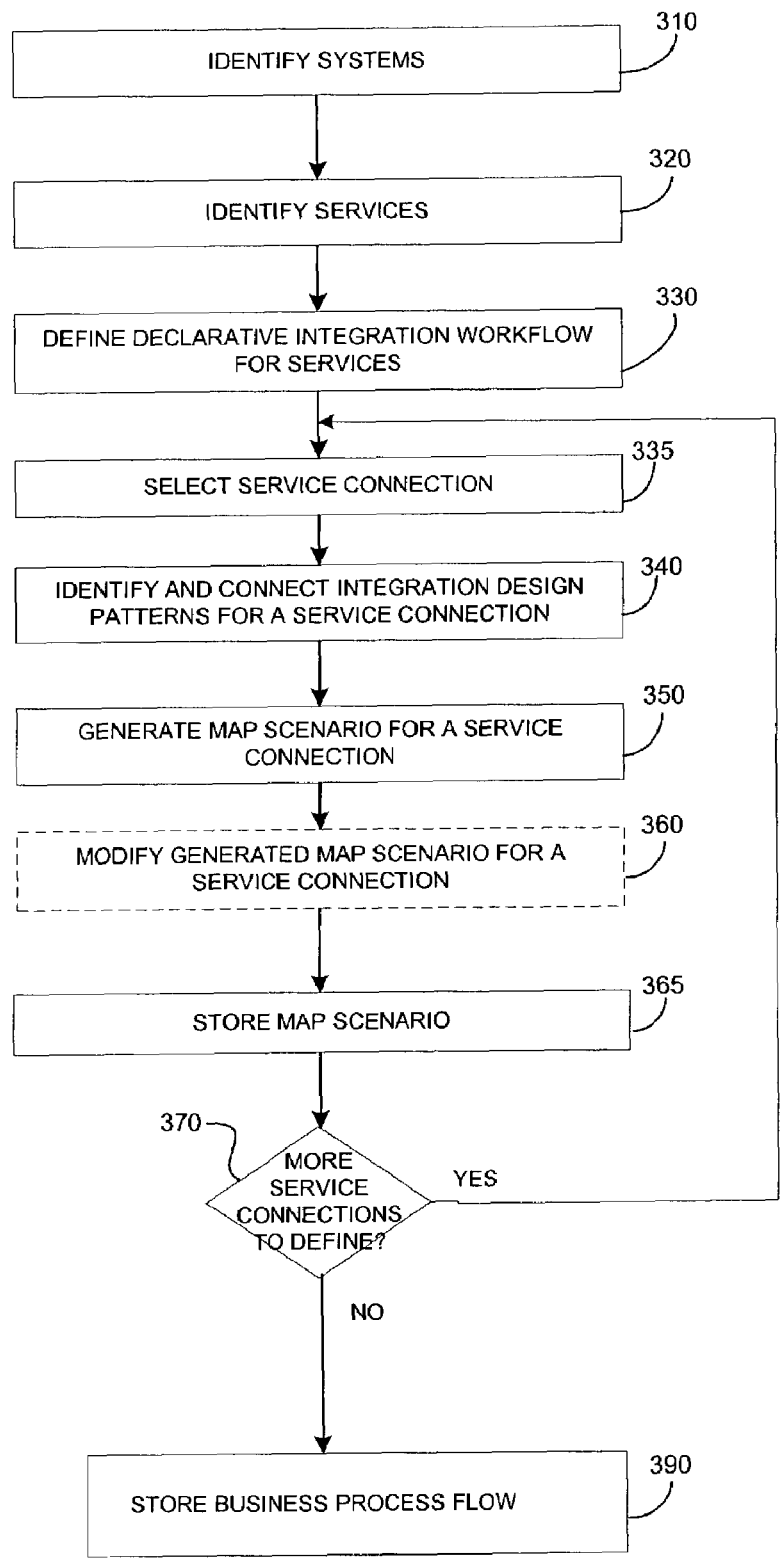
FIG. 3 is flow chart for an example process to develop application integration software using an application integration workstation.

FIG. 3 depicts a process 300 for developing application integration software using an application integration workstation. In general, a developer identifies two application systems involved in exchanging data and a connection between the two application systems that represents the data to be exchanged. For the connection, the developer identifies a series of declarative integration design patterns to describe the data exchange (including data transformation) between the application systems. The developer may identify a declarative integration workflow that identifies the objects to be exchanged between two or more systems, the sequence of particular transformation functions, the physical field to field transformations required, and the physical connection to be established between the systems. A declarative integration design pattern is a reusable pattern that declares the rules used and the functions performed to integrate the two application systems. Functional (or integration) atoms that represent a unit of integration that is either performed completely or not at all in the integration are then generated by the application integration workstation. The functional atoms may be assembled into source code and/or executable instructions for application integration software.

The application integration software developed in FIG. 3 may be referred to as a business process flow. The server that executes the business process flow may be referred to as a business process server. A business process flow may include more than one map scenario. Typically, a business process flow includes many map scenarios. A map scenario is executed by a mapbox that is a service, or other group of executable functions, in a server environment. For example, a mapbox used to execute a map scenario may be embedded in a web server environment or a data processing server environment that includes remote procedure calls and/or remote function calls. The application integration software may be used to perform the data exchange between the application systems. Additionally, in some implementations, the developer may identify more than two application systems to be integrated. The developer iteratively describes each service connection. The application integration workstation generates application integration software for each service connection. In some implementations, data exchange may occur for more than two application systems.

More specifically, the process 300 begins when a developer selects one or more systems from a list of systems presented by the application integration workstation (step 310). For each system selected, the developer identifies one or more services from a list of possible services (for example, web services) available from that system which are presented by the application integration workstation (step 320). The application integration workstation presents both the list of application systems and the list of web services available from each system by accessing a component landscape repository (that stores application systems and services available from each application system). The developer selects the services with which to work. For example, the developer may select one or more components from a presented list and the application integration workstation may delete the services that are not selected. Alternatively, the developer may delete one or more presented services such that the undeleted services indicate which components are selected.

The developer then defines a declarative integration workflow for the services identified in step 320 (step 330). A declarative integration workflow may identify a series of declarative patterns that accomplish the data exchange between the identified services. A declarative pattern may identify a reusable component for an integration function, such as a component that identifies the data to be exchanged, the data transformations to be performed, and data validation to be performed. The declarative patterns, for example, may include an integration design pattern (described below in step 340) or a functional atom (described below in step 350). A declarative integration workflow is defined declaratively through the identification and sequencing of reusable components. In contrast, a conventional approach to the development of application integration software may merely identify the data to be exchanged between two different application systems.

For example, to start the definition of a declarative integration workflow, the developer may connect two services with a line indicating that the services exchange data with one another. Each line represents a service connection (or an application integration step) for which integration information must be defined and for which application integration software must be developed. The developer may continue to define additional service connections until all of the service connections have been identified for a declarative integration workflow.

The developer then proceeds to select a particular service connection for which the connectivity and data transformation is declaratively defined (step 335). For the selected service connection, the developer identifies and connects integration design patterns (step 340). For example, the developer may be presented with a series of control shapes (or a palette) in a window. Each control shape may be associated with a particular integration design pattern. The developer may drag-and-drop a particular control shape from the palette onto a second window. The developer may order or otherwise sequence the control shapes in the second window. Example integration design patterns include validating an object for mandatory information, splitting data from one object into separate objects, invoking a key mapping function (for example, calling a subroutine that translates a key field for customer information in one application system to a key field for the same customer information in another application system), invoking a data transformation function, and invoking a connectivity function for a particular web-service. Some design patterns may decompose into additional patterns. For example, invoking a particular key mapping function may call an additional design pattern to identify the values in the key field, read the key value store to identify the corresponding key in the target data, generate a new key if needed, and update the output document with the accessed/generated key.

The application integration workstation then generates a map scenario for the particular service connection (step 350). The application integration workstation generates a map scenario that includes one or more functional atoms based on the integration design patterns identified and connected in step 340. For example, the application integration workstation may access a table that identifies a predefined map scenario and/or one or more functional atoms to be generated based on each integration design pattern identified. The map scenario generated may include XML documents with an XML document corresponding to a functional atom. The XML documents may be combined into a single map scenario XML document.

In some cases, a map scenario or a functional atom template may be generated and the template may be modified by a developer. For example, a functional atom may include a generic template for connecting to an application system. In this example, the generic template may include selecting a particular communication mode (for example, a synchronous mode or an asynchronous mode), identifying one or more queues with which to be connected, and providing system authentication information (for example, a user or account name or password). In some implementations, a developer may select a particular functional atom that includes the connectivity information required for a particular web service. In such a case, the developer may select a particular connectivity functional atom and does not need to modify a connectivity functional atom that includes only a connectivity template.

Optionally, the developer may modify the map scenario or map scenario template generated (step 360). For example, the developer may select an integration design pattern, and the application integration workstation may present a list of functional atoms that correspond to the selected integration design pattern. The developer then may select a particular functional atom to modify. The application integration workstation displays the functional atom. The developer may edit the functional atom and save the modified functional atom. In some cases, when only one functional atom corresponds to the integration design pattern selected, the application integration workstation may display the functional atom without first presenting a list of the one functional atom from which the developer selects the only functional atom presented.

The application integration workstation stores the map scenario (step 365). The map scenario may be stored in a map store or other type of data repository.

The developer determines whether another service connection needs to be defined (step 370). If so, the developer selects a particular service connection (step 335) and proceeds as described previously. When the developer has completed the definition of the service connections, the application integration workstation stores the business process flow (step 390). The business process flow includes a map scenario for each service connection. The business process flow also may include connection parameters to establish a connection with service connections included in the business process flow. The business-process flow may be stored in repository. The application integration workstation may store other information about the integration landscape associated with the business process flow. For example, a list of the application systems, the services, the declarative integration workflow, and functional atoms that correspond to each integration design pattern in the declarative integration workflow may be associated with the business process flow and stored The design and development of application integration software using a declarative process, such as process 300 in FIG. 3, may be beneficial. For example, the application integration software generated is structured based on functional atoms. The structured application integration software generated may be more comprehensible to developers and may result in fewer programming errors.

Figure 4:
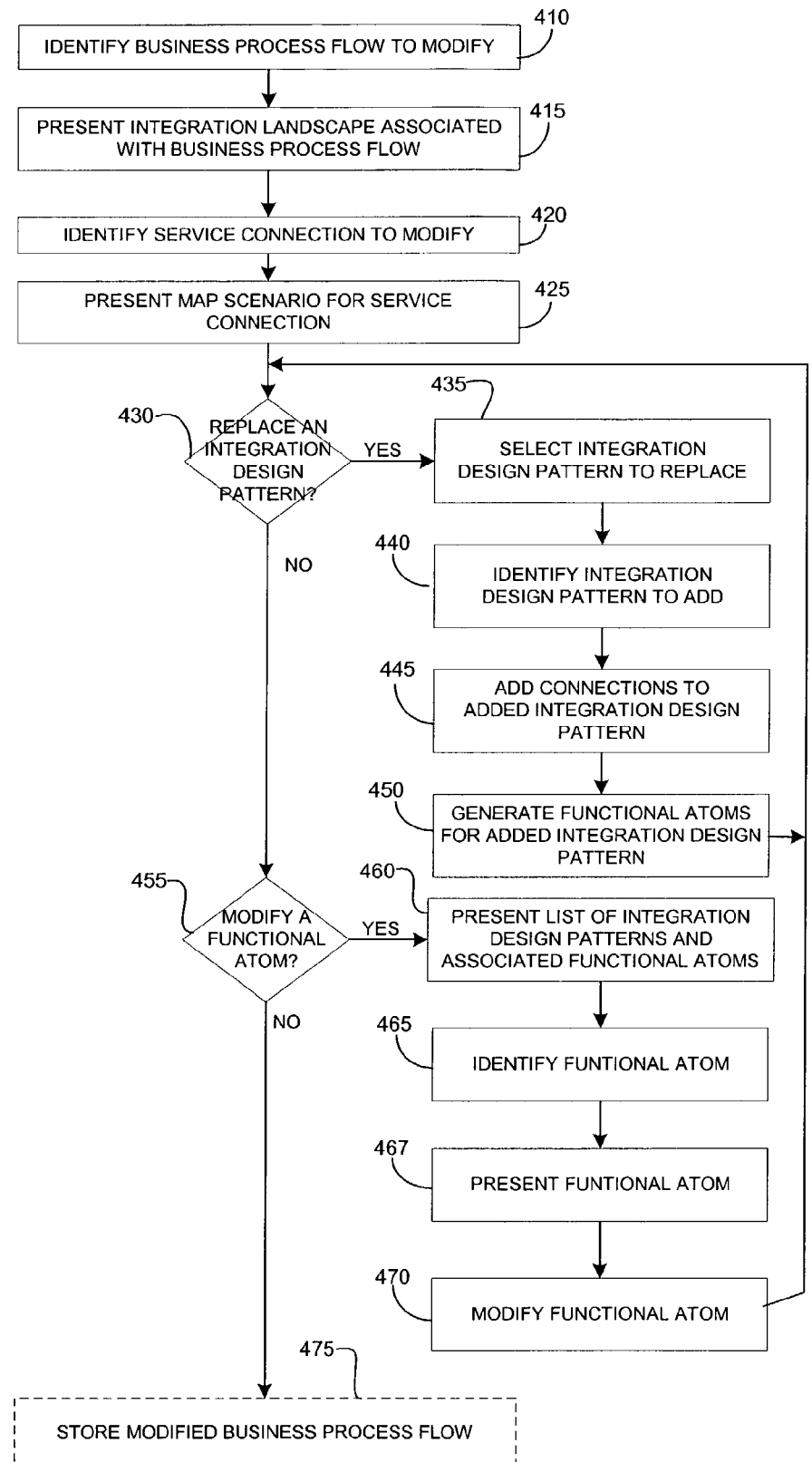
FIG. 4 is a flow chart for an example process to modify application integration software using an application integration workstation.

Referring to FIG. 4, a business process flow may be modified using a visual modeling interface. In general, the application integration workstation presents a visual representation of the integration landscape defined for a particular business process flow. The business process flow may include one or more service connections, and each service connection may be associated with a map scenario. The visual representation may be similar to the one described in FIGS. 17–19. The application integration landscape may have been defined, for example, using a process the same as or similar to process 300 in FIG. 3. A developer identifies a portion of the landscape to be modified (for example, an application system, a service, a service connection, a map scenario, an integration design pattern in a service connection, or a functional atom associated with a design pattern in a service connection). The application integration workstation presents the portion of the map scenario that corresponds to the portion of the landscape identified.

The use of a visual modeling interface or process in the modification of application integration software, such as a map scenario, may be beneficial. For example, the developer identifies the portion of the application integration software to be modified using a model. The developer may not need to search through many and/or voluminous source code modules to find the portion of the application integration software to be modified as the developer otherwise may have had to do. The developer also may be reminded by features in the integration landscape presented that additional modifications may need to be made that the developer otherwise may not have realized.

FIG. 4 depicts an example process 400 for modifying application integration software that uses declarative design patterns to integrate applications. In example process 400 a particular service connection in a business process flow is modified by replacing one or more integration design pattern in the service connection and/or modifying one or more functional atoms. The developer identifies a particular business process flow to modify (step 410). For example, a list of all business process flows in a repository may be presented from which the developer selects. Alternatively, the developer may be able to identify a particular business process flow by name, key identifier, or other unique identifier.

The application integration workstation presents an integration landscape that is associated with the business process flow (step 415). The integration landscape may have been defined and stored, for example, using a process the same as or similar to process 300 in FIG. 3. The integration landscape includes one or more application systems, at least one service for each application system, and one or more service connections that indicate a data exchange between two services. The integration landscape also includes a declarative integration workflow for each service connection. The declarative integration workflow includes one or more integration design patterns and the flow (or order of invoking) each integration design pattern. The integration landscape includes a list of the one or more functional atoms associated with each integration design pattern in the declarative integration workflow.

The developer identifies a particular service connection to modify (step 420). The application integration workstation presents the map scenario that is associated with the identified service connection (step 425). The presentation of the map scenario includes the presentation of integration design patterns for a service connection that are associated with the map scenario. When the developer determines that an integration design pattern in the identified service connection is to be replaced with a different integration design pattern (step 430), the developer selects a new particular integration design pattern to replace the existing one (step 435). For example, the developer may identify a particular integration design pattern based on a unique identifier associated with the particular integration design pattern. The developer may identify a particular integration design pattern by selecting one (for example, by double-clicking a pointing device while a particular integration design pattern is identified) from several integration design patterns presented. The developer identifies an integration design pattern to add, such as by selecting an integration design pattern from several integration design patterns presented (step 440). This may be accomplished in a manner the same as or similar to step 340 in FIG. 3. The developer may identify an integration design pattern by identifying a particular integration design pattern using a name or unique identifier. The developer adds one or more connections from the added integration design pattern to other integration design patterns in the map scenario (step 445). The application integration workstation generates one or more functional atoms for the added integration design pattern (step 450). This may be accomplished, for example, in a manner similar to step 350 in FIG. 3. Optionally, the functional atoms in the map scenario may be modified by the developer, as described in step 360 in FIG. 3.

When a developer determines that a functional atom is to be modified and so indicates to the application integration workstation (step 455), the application integration workstation presents a list of integration design patterns associated with the service connection identified in step 420 (step 460). For each integration design pattern presented, the application integration workstation identifies the one or more functional atoms associated with the integration design pattern. For example, the application integration workstation may present a list of integration design patterns, with the functional atoms associated with each integration design pattern presented as a list nested under the associated integration design pattern.

The developer identifies a particular functional atom to modify (step 465), and the application integration workstation presents the portion of the map scenario that relates to the functional atom identified (step 467). The developer may review and modify the displayed functional atom (step 470). The developer may continue to review and make modifications to a service connection by replacing an integration design pattern (steps 435–450) and by modifying a functional atom (steps 460–470) until the developer is satisfied.

After the developer has completed modifying the business process flow, the application integration workstation may store the modified business process flow (step 475). The application integration workstation stores the modified business process flow only when one or more functional atoms have been modified or when one or more integration design patterns have been replaced.

The process 400 is an example of how a business process flow may be modified. Some implementations may use other processes and software engineering techniques to modify a business process flow or an aspect of a business process flow. For example, a service connection may be added to the integration landscape of a particular business process flow. The application integration workstation may present the integration landscape and the developer may add a new service connection, for example, as described in steps 335–360 in FIG. 3, to a business process flow associated with the integration landscape. The functional atoms generated may be added to a map scenario associated with the business process flow.

In some implementations, a developer may identify a particular service connection to be deleted. For example, a developer may use a pointing device to identify a particular service connection (for example, click on the service connection) to be deleted (for example, the developer may drag-and-drop the service connection into a delete container). The application integration workstation may remove from the business process flow the functional atoms in the map scenario associated with the service connection from the business process flow. The application integration workstation may use the integration landscape information to determine which functional atoms are associated only with the service connection. For example, the application integration workstation may store a direct association between a functional atom and a service connection. Additionally or alternatively, the application integration workstation may determine the association between a functional atom and a service connection indirectly. For instance, the application integration workstation may determine which declarative integration workflow is associated with the service connection, determine which integration design patterns are associated with the associated declarative integration workflow, and determine which functional atoms are associated with each integration design pattern associated with the associated declarative integration workflow. The application integration workstation may delete each identified functional atoms when a particular functional atom is only used in the service connection to be deleted. For example, the application integration software generated by the application integration workstation may permit a functional atom to be used in only one service connection.

Alternatively or additionally, a developer may identify a particular service to be deleted. The application integration workstation removes all functional atoms in the map scenario related to the all of the service connections that involve the identified service. Similarly, a developer may identify a particular system for which all services are to be removed. The application integration workstation removes from the map scenario each functional atom associated with an integration design pattern that is associated with a service connection that is associated with the particular system that is to be removed.

In some cases, an application integration workstation may permit a developer to add one or more services for a system in the integration landscape of the business process flow. An application integration workstation may permit a developer to add to the integration landscape one or more systems and one or more services associated with each added system.

Figure 5:
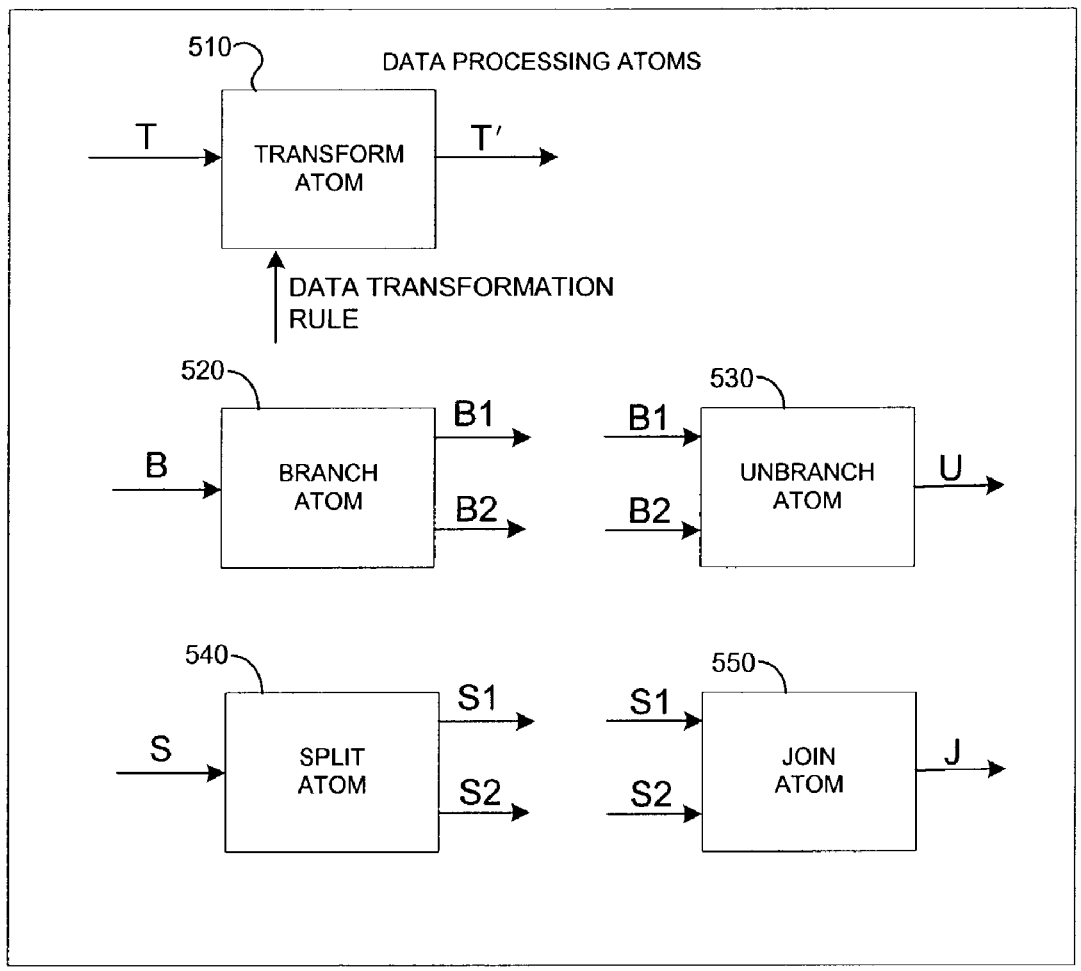
FIGS. 5–7 are diagrams of functional atoms of application integration software.
Figure 6:
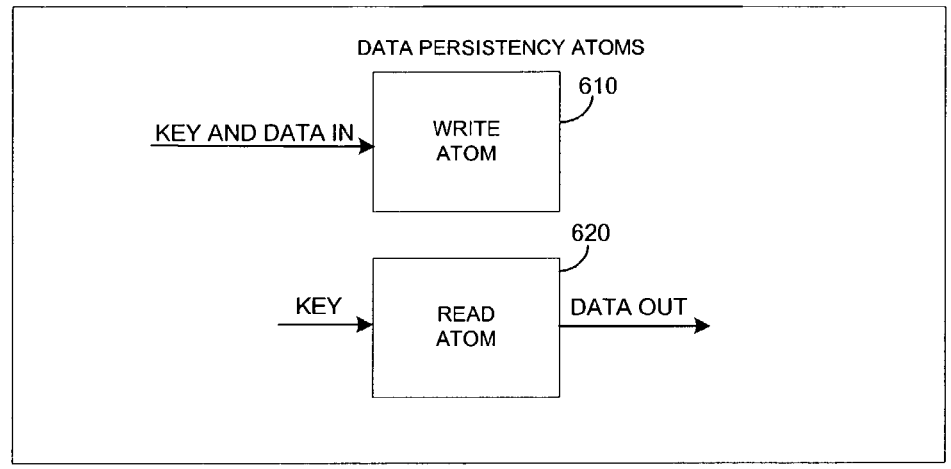
Figure 7:
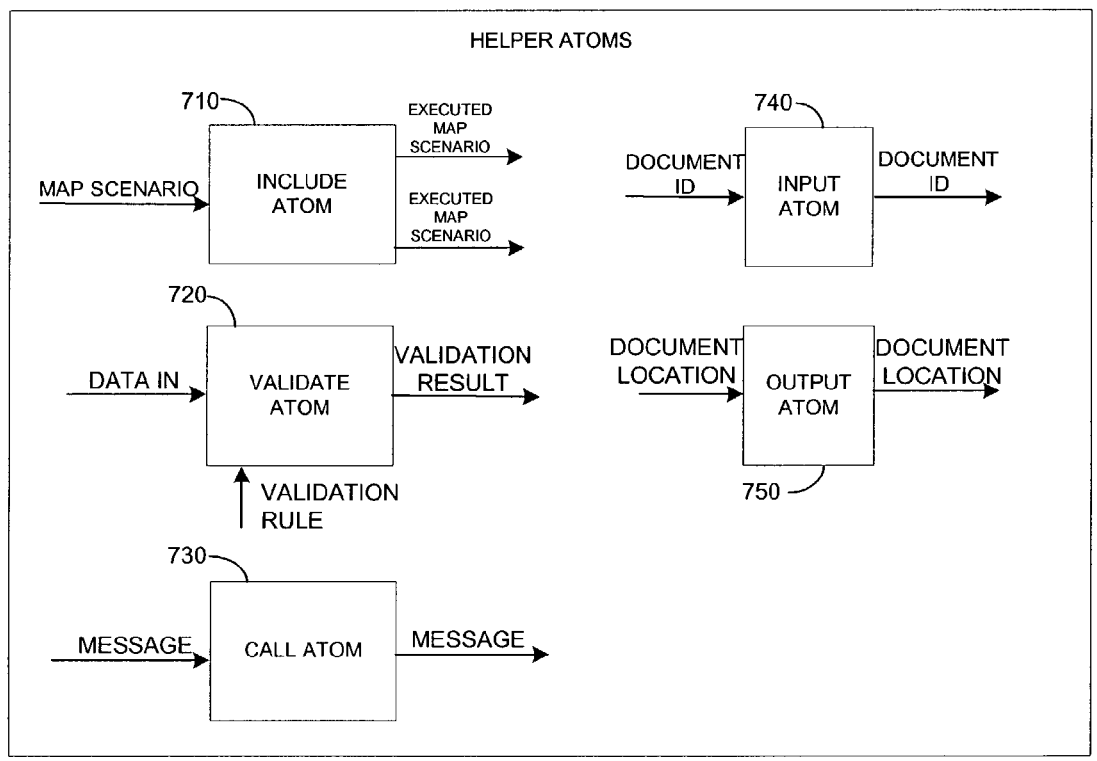

Referring to FIGS. 5–7, types of functional atoms are illustrated. In general, a functional atom declaratively describes a type of discrete integration procedure. The functional atom includes data transformation logic. A functional atom defines the semantic processing necessary to perform a particular data transformation process. Functional atoms may be implemented, for example, as a program module, a subroutine, or a series of XML documents. For example, the contents of an XML document may be transformed using the eXtensible Stylesheet Language ("XSL") and the XSL Transformation language (XSLT). In general, an XML processor may apply data transformation rules stored in an XSLT stylesheet to an XML document to create a transformed XML document.

FIGS. 5–7 respectively illustrate data processing atoms 500, data persistency atoms 600, and helper atoms 700. The functional atoms shown in FIGS. 5–7 are provided as illustrative implementations. Some implementations may use other types of functional atoms. One or more functional atoms may be used in application integration software used for data exchange. One or more functional atoms may be grouped in a map scenario. A mapbox is a service that executes a map scenario.

FIG. 5 shows illustrative data processing atoms 500, including a transform atom 510, a branch atom 520, an unbranch atom 530, a split atom 540, and a join atom 550. The transform atom 510 receives an XML document as input (here, document T) and a transformation rule. The transformation rule may be an XSLT stylesheet that contains one or more transformations. The XSLT stylesheet also may include some programmatic code (such as code developed in the Java programming language) that may be executed out of the stylesheet. The mapbox processor applies the identified XSLT stylesheet to the received XML document to produce the transformed XML document. All data required by the transform atom 510 is provided through the XML document received or the map scenario. The transform atom 510 is not permitted to access any external data. The transform atom 510 produces a transformed XML document (here, document T'). The XML document received as input or produced as output by the transform atom 510 or any other atoms may be represented, for example, as an XML-Document Object Model (DOM) document that is a parsed representation of an XML document in memory using a tree structure. DOM is a specification that describes how objects in a Web page are represented.

The branch atom 520 divides the received XML document into one or more separate XML documents. The branch atom 520 allows conditional processing to be performed on the transformed XML documents. The branch atom 520 receives an XML document (here, document B), transforms the received XML document into various XML documents based on the content within the received XML document, and produces one or more transformed XML documents (here, document B1 and document B2). Typically, more than one transformed XML document is produced by a branch atom 520. The transformed documents then may be processed differently using subsequent atoms based on the content contained in the transformed documents. The branch atom 520 identifies each output XML document as a sequential number of a total number (for example, 1 of 4, 2 of 4, 3 of 4, 4 of 4) in a particular map scenario process.

The functional counterpart to a branch atom 520 is an unbranch atom 530. The unbranch atom 530 receives a set of one or more XML documents (here, documents B1 and B2) and begins processing the XML documents only when all of the input documents have been received. The unbranch atom 530 determines when all of the input documents have been received based on the total number of documents as identified by the branch atom that produced the input document. This may enable the unbranch atom 530 to determine how many input documents are required when the unbranch atom 530 receives any one of the input documents. The unbranch atom 530 does not require that the documents be received in sequential order. The output document produced by the branch atom 520 may be an XML document. The output XML document includes all data from the one or more input XML documents. Here, the output document produced is document U.

Like the branch atom 520, the split atom 540 accepts a single XML document as its input (here, document S) and produces a set of one or more XML documents (here, document S1 and document S2). Typically, a split atom 540 produces more than one XML document. The split atom 540 divides the received XML document based on the identification of repeated data of a similar kind (for example, an array) within the received XML document. Each output XML document includes a sequential tag that identifies the sequential number of the document produced and the total number of XML documents produced, as does the branch atom 520. The split atom 540 may facilitate parallel processing. Each XML document produced may be processed independently in a separate processing path (or thread) from the other XML documents produced by split atom 520. This may enable a map scenario to take advantage of parallel processing capability in a computing system.

The join atom 550 accepts a set of one or more XML documents (here, document S1 and document S2) that were produced by a split atom. The join atom 550 waits for all of the required XML documents to begin processing. Like the unbranch atom 530, the join atom 550 determines whether all required XML documents have been received based on the sequential tag associated with any of the received input XML documents.

FIG. 6 illustrates data persistency atoms 600 including a write atom 610 and a read atom 620. The write atom 610 provides the capability to the map scenario to store a particular XML document in storage accessible to the mapbox. For example, the write atom 610 may store an XML document using a particular key value in a map scenario repository, such as map scenario repository 970 of FIG. 9 or map store 1030 of FIG. 10. The write atom 610 accepts one or more key values and data stored in an XML document as inputs and writes the data and key to the appropriate data store. The write atom 610 may provide a confirmation message that includes an indication whether the write operation was successful and/or the number of records (or other types of data collection) written to storage. The data to be stored may include, for example, a results set from the performance of a data query.

The read atom 620 may be used to retrieve data that has been stored using a write atom 610. One or more key values are provided to the read atom 620. The read atom 620 accesses the XML document that corresponds to each key value provided and outputs an XML document that includes the XML documents accessed. The data accessed may, for example, be a results set from the performance of a data query. For example, the mapbox may maintain a list of key values with each key value being associated with a particular XML document in a mapping data store, such as map scenario repository 970 of FIG. 9 or map store 1030 of FIG. 10.

FIG. 7 depicts helper atoms 700 including an include atom 710, a validate atom 720, a call atom 730, an input atom 740, and an output atom 750. The include atom 710 provides the capability of including a map scenario within another map scenario. This may permit a particular map scenario to be reused in a different map scenario. The ability to include (or nest) map scenarios may reduce the amount of time needed to develop or maintain a map scenario. For example, some of the functionality needed for a map scenario may be available in another previously developed map scenario. The previously developed map scenario may be "included" in the map scenario. Such reuse of existing code (here, a map scenario) may help reduce the time and cost required to develop application integration software. The include atom 710 receives a map scenario as input and invokes the received map scenario. An include atom 710 may be able to be performed conditionally. This may permit, for example, an include atom 710 that is used to provide default settings to the mapbox when a particular environment settings have not been identified (for example, through an installation or setup process). When an include atom 710 receives a map scenario that includes one or more other map scenarios, the include atom 710 may invoke more than one map scenario.

The validate atom 720 allows the validation of an input XML document against a particular XML schema definition (such as a World Wide Web Consortium (W3C) schema or an XML schema definition (XSD)) to determine whether the document fulfills the required structure. The validate atom 720 receives a validation rule, typically in the form of a schema document, that is applied to the input XML document. The validation rule may be a complex validation rule that includes more than one validation rules. The mapbox may only access a validation rule that is available within the mapstore. This may help ensure that the mapbox performs the function of an isolated mapping point. The validate atom 720 may be performed conditionally. For example, a validate atom 720 may be performed only when a debugging setting is activated. This may permit having particular validation rules apply only during debugging activities without requiring a modified map scenario to be used during debugging. The validation results indicate whether the validation was successful or not. In some implementations, the validation atom 720 conditionally executes one of two mutually exclusive exits based on whether or not the validation was successful.

The call atom 730 provides information needed to establish a connection to a particular system and establishes the connection. Connectivity information may include connection parameters, such as the communication mode (for example, synchronous or asynchronous communication), one or more queues with which a connection is to be established, and authentication information required by the system (for example, login procedures to be accessed, user names, passwords). Connectivity information may include connection parameters for a web service, a remote procedure call, or a remote function call.

A map scenario includes an input atom 740 and an output atom 750. The input atom 740 and the output atom 750 are pre-configured to identify the location (or other type of identifier) of the input document and the location (or other type of identifier) where the output document is to be placed for a particular map scenario. The input atom 740 may represent an XML document that is used as an input to the map scenario. The output atom represents where the final result is placed.

The input atom and output atom each receive a document identifier and outputs a document identifier. The output atom 750 may include more than one document identifier when a map scenario produces more than one document. The document identifier may include, for example, the location in which the document is stored or is to be stored.

Figure 8:
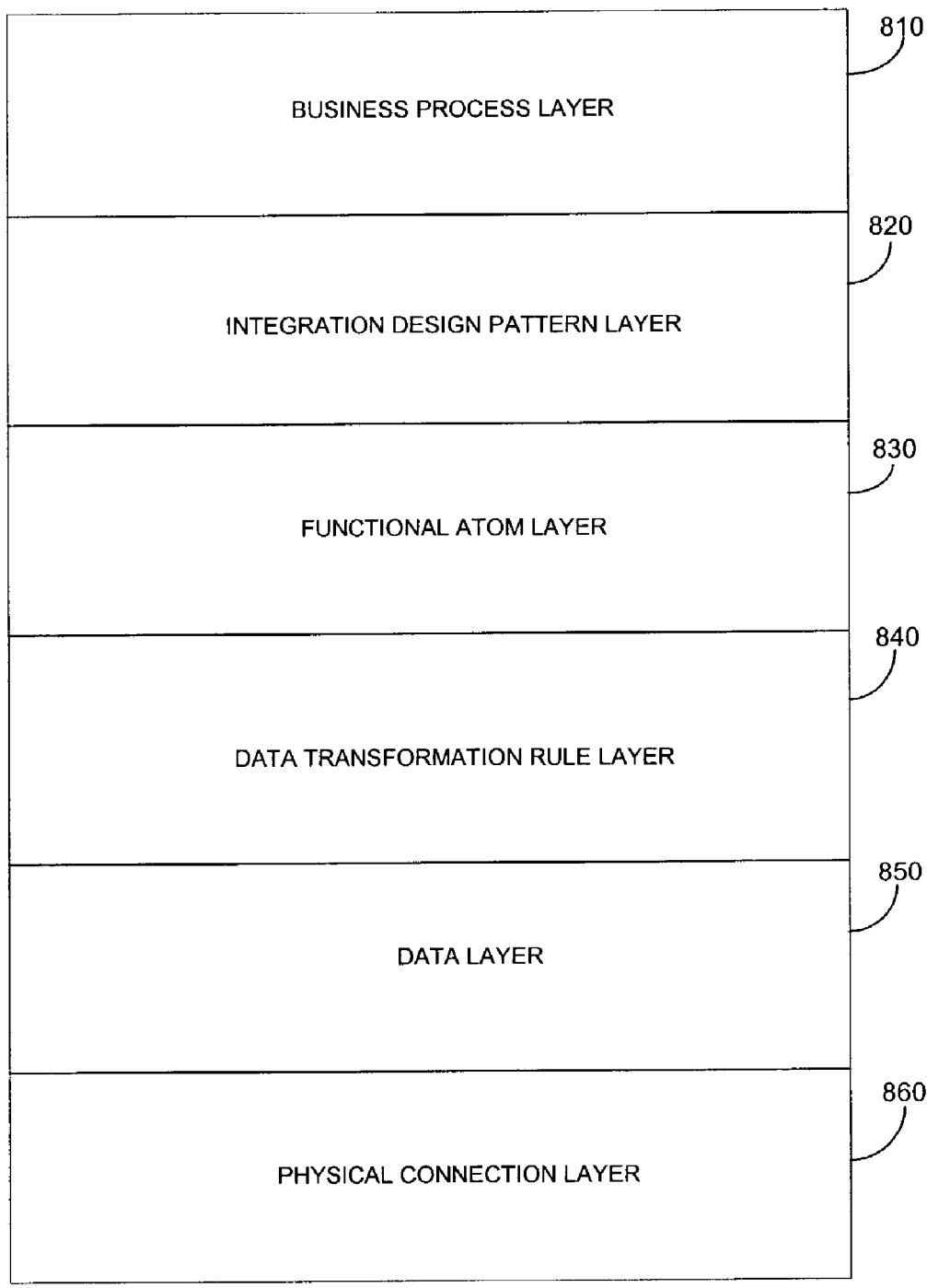
FIG. 8 is a diagram of a multi-layer architecture for application integration software.

FIG. 8 depicts an multi-layer architecture 800 for application integration software. The multi-layer architecture 800 is divided into six layers. From top to bottom, the layers include a business process layer 810, an integration design pattern layer 820, a functional atom layer 830, a data transformation rule layer 840, a data layer 850, and a physical connection layer 860. Each particular layer leverages the one or more layers that are below the particular layer.

The business process layer 810 may identify the application system or computing system with which a data exchange or other application integration function is to be performed. The business process layer 810 also may identify a particular service on a computing system. For example, business process layer 810 may refer to a particular web service available on a host system accessible through an Internet connection.

The integration design pattern layer 820 identifies a declarative design pattern that identifies an integration function that may be leveraged during a data exchange or other application integration function. An integration design pattern may be, for example, an integration design pattern described with respect to FIGS. 3–4.

The functional atom layer 830 identifies a functional atom that declaratively describes a discrete action that relates to an application integration function. An example of an application integration item that occurs at the functional atom layer 830 is a functional atom. Functional atoms also have been described generally in FIGS. 2–3. Particular functional atoms have been shown in FIGS. 5–8. Representations of functional atoms that are represented as XML documents are described in FIGS. 12–16.

The data transformation rule layer 840 identifies a data transformation rule or other data transformation logic that describes how data may be changed or transformed. For example, one or more data keys, data values, data format, or data structure may modified by a data transformation rule. An example of an application integration item in the data transformation rule layer 840 is an XSLT stylesheet. An XSLT stylesheet describes how to modify data in an XML document.

The data layer 850 includes data, such as object instances, attributes, attribute values, and control data, that may be included in an application integration function, such as data exchange. An example of an application integration item in the data layer 850 is a message that includes data to be sent from one system to another system.

The physical connection layer 860 includes the physical connection and network that is used to connect two computer systems involved in an application integration function. An example of an application integration item in the physical connection layer 860 includes a wired or wireless WAN connection that connects two computer systems. The physical connection layer 870 also may include the identification of a queuing service and access number (such as an dial-up access telephone number of an Internet Protocol address) that may be used to connect to a particular computer system and service.

Figure 9:
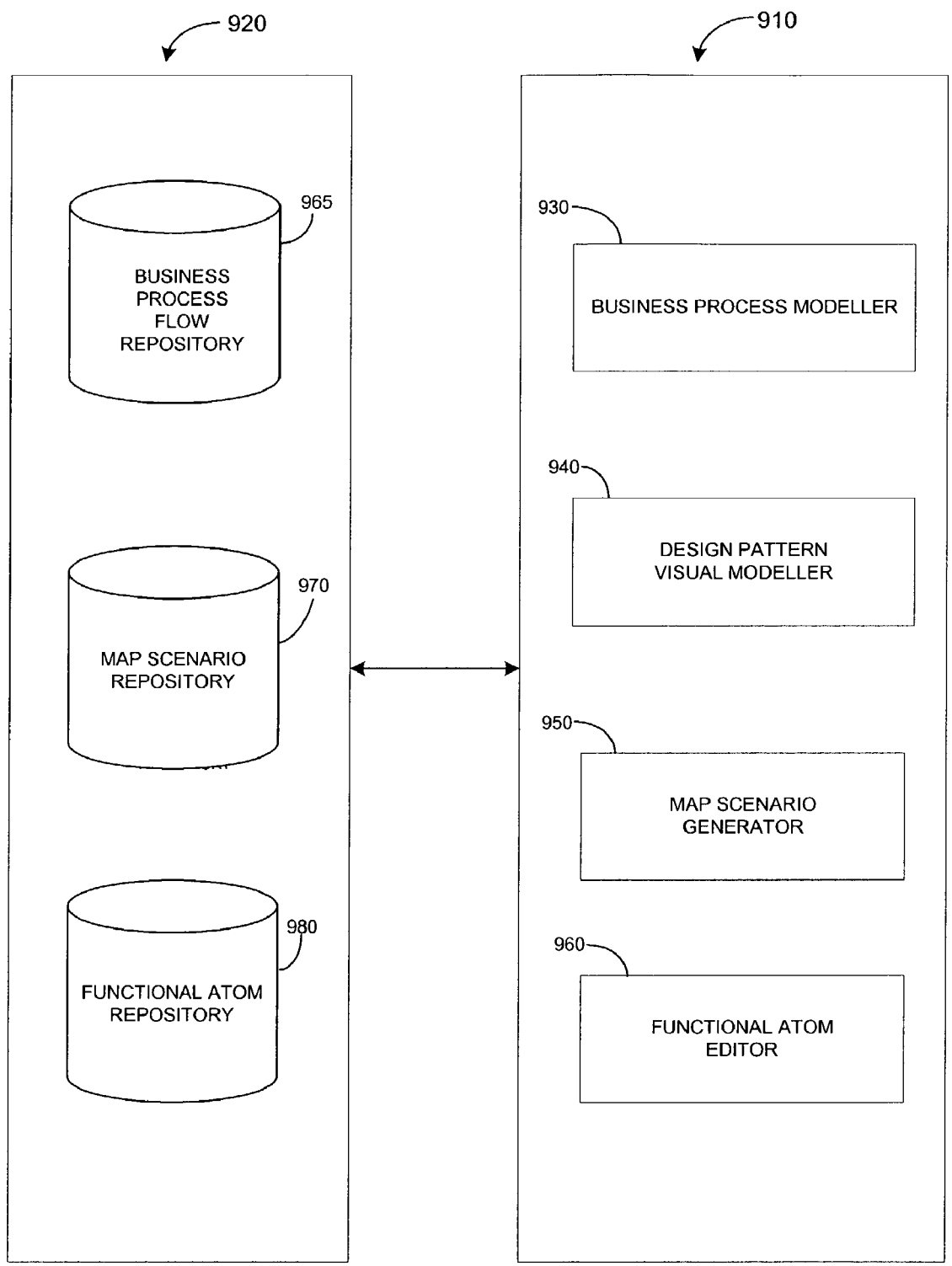
FIG. 9 is a diagram of the components of a software architecture for an application integration workstation.

FIG. 9 shows the components of a software architecture 900 for integrating application systems using a multi-layer, declarative approach to constructing and maintaining application integration software. The software architecture 900 has an application integration designer processing component 910 and data components 920 used by the application integration designer. Application integration designer processing component 910 includes a business process flow modeller 930, design pattern visual modeller 940, a map scenario generator 950, and a functional atom editor 960. Data components 920 include a business process flow repository 965, a map scenario repository 970, and a functional atom repository 980.

The business process flow modeller 930 produces a visual representation of a business process flow associated with an integration landscape, such as the business process flow presented in step 410 of FIG. 4 or the integration landscape presented in step 415 of FIG. 4. The business process modeller also may produce a business process flow model that is used by a developer or other user to create a map scenario, such as described in steps 310–330 in FIG. 3. The business process flow modeller 930 uses data about systems and what services are associated with each system from the business process flow repository 965. A business process flow model may the same as or similar to the business process flow described in FIGS. 3, 4 or 12.

The design pattern visual modeller 940 produces a visual representation of a declarative integration workflow associated with a particular service connection in a business process flow. For example, the design pattern visual modeller 940 may produce a visual model that is used when a map scenario is modified, such as presenting the map scenario for a particular service connection in step 425 of FIG. 4 and presenting a list of map scenarios from which a developer or other user may select. The design pattern modeller 940 may access, create, and/or modify data about design patterns from the map scenario repository 970 and/or the functional atom repository 980.

The functional atom editor 960 permits a developer or other user to modify a functional atom, such as in step 470 in FIG. 4. The functional atom editor 945 may access functional atoms stored in the functional atom repository 980 or may access functional atoms in a map scenario stored in the map scenario repository 970. The functional atom repository 980 may store a functional atom object, model or template for one of several types of functional atoms, such as the functional atoms shown in FIGS. 5–7. A functional atom object, for example, may be used to create an instance of a functional atom that is used in a particular map scenario. The modified functional atom instances are stored with or in the map scenario in the map scenario repository 970.

The map scenario generator 950 may generate a functional atom instance from a functional atom associated with an integration design pattern. For example, the map scenario generator 950 identifies one or more functional atom objects associated with an integration design pattern, for example, in a manner similar to or the same step 450 in FIG. 4. The map scenario generator 950 instantiates a functional atom instance based on the identified functional atom object. The map scenario generator 950 also associates the functional atom instance with a particular integration design pattern in a particular map scenario. The functional atom instance is stored with the map scenario in the map scenario repository 970.

Figure 10:
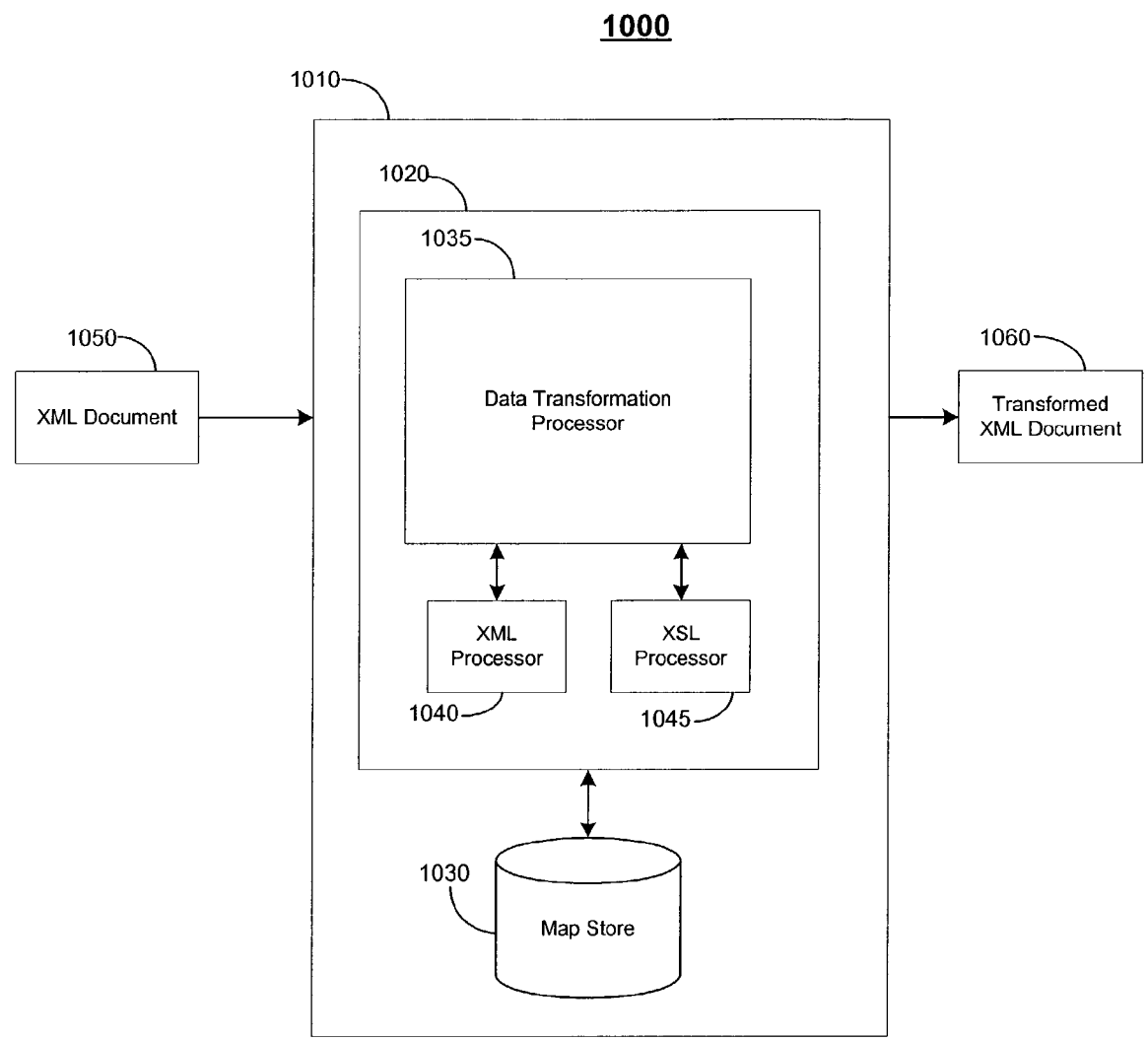
FIG. 10 is a diagram of the components of a software architecture for an application integration software or program that includes functional atoms.

FIG. 10 depicts the components of a software architecture 1000 for processing application integration software that includes a functional atom. FIG. 10 uses a particular web-based implementation for illustrative purposes. The web-based implementation in FIG. 10 may be referred to as a mapbox. The mapbox processes a map scenario that includes functional atoms.

The mapbox architecture 1000 may be implemented, for example, on computer system 110 of FIG. 1. The mapbox architecture 1000 includes a server 1010. The server 1010 includes a processing component 1020 and data storage 1030. The processing component 1020 includes a data transformation processor 1035, an XML processor 1040, and an XSL processor 1045. Processing component 1020 may be implemented on a web server, such as a server operating a version of Internet Information Server by Microsoft Corporation of Redmond, Wash. or an Apache server that operates web server software available in the public domain. Data storage 1030 may be referred to as a map store. Data components stored in the map store 1030 may be stored using a relational database management system that is capable of being accessed through a web server. Examples of such a relational data management system include SQLServer by Microsoft Corporation of Redmond, Wash. and Oracle Database by Oracle Corporation of Calif.

An XML document 1050 is received, for example from computer systems 115, 120 or 125 of FIG. 1. The data transformation processor 1035 on the mapbox server 1010 receives the XML document 1050. The data transformation processor 1035 uses a map scenario stored in the mapstore 1030 to transform the data in the received XML document. A map scenario includes one or more functional atoms, each of which declaratively describes a step in the transformation process. Functional atoms determine the processing flow of the map scenario and the types of transformations to be performed in the map scenario, as described in FIGS. 5–7 and 12–16.

The data transformation processor 1035 transforms the received XML document 1045 according to the functional atoms in a map scenario. The transformation rules may be stored in the mapstore 1030. The architecture for a mapbox may permit the data transformation processor to function as an isolated mapping point. For example, software architecture 1010 provides the map store 1030, the XML document to be transformed, and a private data store that includes the required transformation and validation rules. All the data required by the map scenario to transform the XML document is present within the software architecture and input document. The data transformation processor 1035 does not access data stored in other data management systems (for example, application-specific code stored in an application system) to accomplish the data transformation.

Typically, the data transformation processor 1035 may create one or more intermediate XML documents as directed by the particular functional atoms in the map scenario. The data transformation processor 1035 applies various transformation atoms in the map scenario. An XML document may be processed by the XML processor 1040 and the XSL processor 1045. For example, an XSLT stylesheet is applied by the XSL processor 1045 to the XML document during the transformation. The transformed XML document 1060 is output.

In some implementations, the transformed XML document 1060 may be further transformed into a format other than an XML document. In some implementations, the data transformation processor 1035 may receive data that is stored in a format other than XML. In such a case, the data transformation processor 1035 preprocesses the received document into an XML format and proceeds as described above.

An operating environment for a software architecture 1000 may include version of Java (a programming language developed by Sun Microsystems, Inc. of Santa Clara, Calif.); a relational database management system such as SQLServer or Oracle that is accessible to Java programs through a Java database connectivity program; and an XML processor that supports a document object model, XSLT with scripting, and includes a validating parser capable of validating an input document using a document type definition. A Java class instance may be created for each type of functional atom, and the necessary functional atoms may be instantiated at runtime for a particular map scenario. Other implementations may use other operating environments, for example, an operating environment that includes software developed using the C++ programming language or the Visual Basic programming language.

Figure 11:
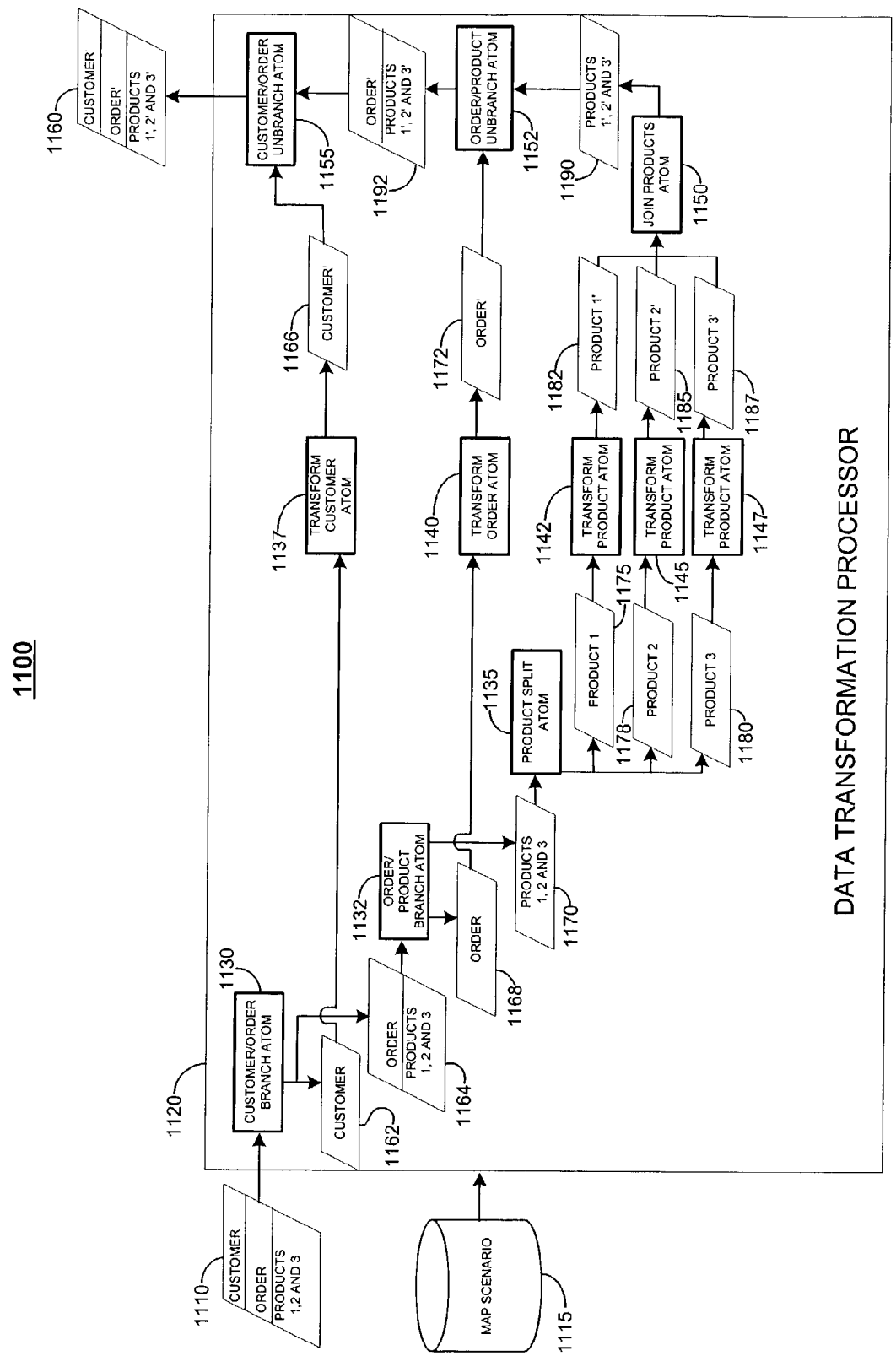
FIG. 11 is a diagram of a process used to transform customer relationship management system data using functional atoms.

FIG. 11 shows a process 1100 for transforming data using functional atoms to transform data from a Customer Relationship Management ("CRM") order entry system to a format that is accepted by an order processing system. The process 1100 may be performed by the data transformation processor 1035 (which may be referred to as a mapbox processor) of FIG. 10. The process 1100 begins when a mapbox processor receives an XML document 1110 containing customer data, order data, and product data, such as order data 210, 215, 220 or 225 of FIG. 2. The mapbox processor uses map scenario data 1115 that includes the data required to perform the transformations defined in the map scenario to be performed by the mapbox processor. The map scenario includes a customer/order branch atom 1130, an order/product branch atom 1132, a product split atom 1135, a transform customer atom 1137, a transform order atom 1140, transform product atoms 1142, 1145 and 1147, a join products atom 1150, an unbranch order/product atom 1152, and an unbranch customer/order atom 1155. Collectively, these atoms transform the received XML document 1110 into the transformed XML document 1160 that is the result of the map scenario 1120.

The mapbox processor invokes the customer/order branch atom 1130 using the received XML document 1110. The customer/order branch atom 1130 produces a customer XML document 1162 that includes the customer data from XML document 1110. The customer/order branch atom 1130 also produces XML document 1164 that includes the order data and product data from XML document 1110.

The mapbox processor invokes the transform customer atom 1137 using customer XML document 1162 to transform one or more fields within the customer XML document 1162. For example, the mapbox processor may enrich the customer data by adding default data. The mapbox may transform data values, such as replacing a particular translation value with a different value that corresponds to the replaced value as described previously with respect to FIG. 2. The transformed customer data is output as XML document 1166. The mapbox processor sends customer XML document 1166 to the unbranch customer/order atom 1155. The unbranch customer/order atom 1155 waits to receive the order input XML document before processing the received customer XML document 1166.

The mapbox processor invokes the order/product branch atom 1132 with the XML document 1164 as input. The order/product branch atom 1132 produces an order XML document 1168 that includes order data in the received XML document 1164. The order/product branch atom 1132 also produces a product XML document 1170 that includes the product data in the received XML document 1164.

The mapbox processor invokes the transform order atom 1140 with the order XML document 1168 as input. The mapbox processor transforms the order XML document 1168 as directed by the XLST stylesheet associated with the transform order atom 1140. For example, the mapbox processor may transform key values, such described previously with respect to FIG. 2. The mapbox processor may transform data value formats, such as the date format transformation described previously with respect to FIG. 2. The transform order atom 1140 outputs a transformed order XML document 1172 that is used as an input to order/product unbranch atom 1152. The order/product unbranch atom 1152 waits for additional input before processing the received transformed order XML document 1172.

The product split atom 1135 is invoked with the product XML document 1170 produced by the order/product branch atom 1132. The product split atom 1135 divides the repeating product data for products 1, 2 and 3 into product XML documents 1175, 1178, and 1180. A transform product atom 1142, 1145 or 1147 is invoked with one of the three product XML documents 1175, 1178 or 1180. The transform product atoms 1142, 1145 and 1147 transform the received product XML document 1175, 1178 or 1180 to a transformed product XML document 1182, 1185 or 1187 based on an XLST stylesheet associated with the transform product atom. The transform product atoms 1142, 1145 and 1147 are instantiations of the same transform product atom. The transform product atoms 1142, 1145 and 1147 may be invoked in parallel which may provide for efficiency improvements in processing the map scenario. Each of the transformed product XML documents 1182, 1185 and 1187 is provided to the join products atom 1150.

When the join products atom 1150 has received all of the transformed product XML documents 1182, 1185 and 1187, the join products atom 1150 assembles the separate transformed product XML documents 1182, 1185 and 1187 into a single transformed product XML document 1190. The transformed product XML document 1190 is provided to the order/product unbranch atom 1152. When the order/product unbranch atom 1152 has received both the transformed product XML document 1190 and the transformed order XML document 1172, the order/product unbranch atom 1152 assembles the separate XML documents 1172 and 1190 into a single transformed order/product XML document 1192. The transformed order/product XML document 1192 is provided to the customer/order unbranch atom 1155. When the customer/order unbranch atom 1155 has received both the transformed order/product XML document 1192 and the transformed customer XML document 1166, the customer/order unbranch atom 1155 assembles the separate XML documents 1192 and 1166 to the transformed customer/order/product XML document 1160 that is the output from the mapbox processor after executing the map scenario.

FIG. 12 is an example of an XML representation of a map scenario 1200. In general, the map scenario 1200 includes the assembled functional atoms that may be executed when the map scenario 1200 is invoked. As illustrated in FIGS. 12–16, each of the functional atoms includes a description, an input identifier, and an output identifier. The description is a textual description that may be associated with an instance of the functional atom. The textual description tag may provide internal documentation and allow a developer or other user to distinguish a functional atom without requiring the developer to read the text or other code within a functional atom. The textual description may be viewable in the application integration workstation.

The input identifier and output identifier are the means by which functional atoms are connected to form a data and process flow. The input identifier and output identifier collectively form a unique path of connectivity between any two functional atoms. The path is identified by an output identifier of a predecessor atom and the input identifier of the successor atom. Error checking is performed by the mapbox to ensure that the path is unique, each input identifier matches an output identifier of another functional atom, and each output identifier matches an input identifier of another functional atom. Most types of functional atoms include one input identifier and one output identifier. Some types of functional atoms permit more than one input identifier and/or more than one output identifier.

The input identifier of a particular functional atom points to the predecessor atom (for example, the functional atom precedes the particular functional atom in a processing flow of the map scenario). An input identifier with a value of zero identifies the entry point into the map scenario where an application system feeds data (here, an XML document) into the map scenario.

The output identifier of a particular functional atom points to the successor atom (for example, the functional atom that follows the particular functional atom in the processing flow of the map scenario). An output identifier with a value of zero identifies the exit point of the map scenario where the overall output (for example, the transformed XML document output, as in item 1060 in FIG. 10) of the map scenario.

The map scenario includes a map scenario header 1210, functional atoms 1215, and optional data converter information 1220. The map scenario header 1210 includes execution path information 1230, a name 1235, a description 1237, a status indicator 1238, and a header wrapper 1210W that denotes a closing delimiter for the map scenario. Execution path information 1230 includes the location of some of the physical files associated with the map scenario. In this implementation, the mapstore uses a uniform resource locator (URL) reference. The URL format used is only valid for storage controlled by the mapbox. This may provide security because the retrieval the transformation documents stored in the mapstore may only be performed by the mapbox. Some implementations may include an authorization process that permits only authorized users or processes to accessing the mapstore. In some implementations, other types of URL references, including public URL references, may be used.

The name 1235 identifies a name for the map scenario. The description 1237 includes a description of the map scenario. The name 1235 and description 1237 provide internal documentation and may help a developer or other user to identify a particular map scenario and understand the function of the map scenario. The name 1235 and description 1237 may be presented in a user interface to help a developer or other user to identify a particular a map scenario. For example, the name 1235 and description 1237 associated with several map scenarios may be presented in a user interface that permits a developer or other user to identify a particular map scenario to be modified. The status indicator 1238 identifies the status of the map scenario. For example, the status indicator 1238 may indicate whether the map scenario is active or not. A mapbox may only execute map scenarios with a status of active. This may permit a developer to indicate whether the particular map scenario is available for use or testing.

The functional atoms 1215 includes the assembled functional atoms that are included in the map scenario. The functional atoms 1215 include a branch atom 1240, an include atom 1250, a transform atom 1260, and an unbranch atom 1270.

The branch atom 1240 includes a name 1242 and a description 1244 that may help a developer or other user to identify a particular atom and understand the function of the atom. The branch atom includes an input identifier tag 1246 with a value of 0. This indicates that the map scenario will process the branch atom 1240 before processing any other functional atoms. The branch atom 1240 includes output identifier tags 1247, 1248, and 1249. The output identifier tags 1248 identify three processing paths in map scenario 1200. The mapbox may direct processing from the branch atom 1240 to the include atom 1250 based on a match of the output identifier tag 1247 in the branch atom 1240 with the input identifier tag 1252 of the include atom 1250.

The include atom 1250 includes a name 1254 and a description 1256 to help a developer identify the particular atom and understand the function performed by the functional atom. The include atom 1250 calls another map scenario that is identified by include information 1257. Here, include information 1257 includes a name of the map scenario to be invoked and a name of a dataset that is used by the map scenario. The capability to include one or more map scenarios within a map scenario may permit a developer to reuse map scenarios that have been developed. The capability to reuse a map scenario may help reduce the time and cost of developing and maintaining application integration software. The capability to include one or more map scenarios within a map scenario also may help a developer understand the processing performed by a map scenario by reducing the complexity of any one map scenario. This may help reduce the time and cost of developing and maintaining application integration software.

After the processing of the included map scenario is completed, the mapbox directs processing to the functional atom identified by the output identifier tag 1258. The output identifier tag 1258 of the include atom 1254 matches the input identifier tag 1272 of the unbranch atom 1270. The unbranch atom 1270 includes a name 1274 and a description 1276 to help a developer identify the particular atom and understand the function performed by the functional atom. After completing any unbranch processing associated with unbranch atom 1270, the mapbox completes processing the map scenario 1200 as indicated by the output identifier tag 1277 of the unbranch atom 1270. Unbranch atom 1270 has an output identifier value of 0 that indicates that the map scenario has completed processing all functional atoms associated with the map scenario.

Alternatively to processing the document received by the mapbox using the included map scenario (by directing processing to the include atom 1250), the mapbox may direct processing from the branch atom 1240 to the transform atom 1260 based on a match of the output identifier tag 1248 in the branch atom 1240 with the input identifier tag 1282 of the transform atom 1260. The transform atom 1260 includes a name 1284 and a description 1286 to help a developer identify the particular atom and understand the function performed by the functional atom. The mapbox transforms the data in the received document by applying the data transformation rules included in XSLT stylesheet identified in rule 1288. Alternatively, transform atom 1260 may have included the data transformation rules themselves in rule 1288. The mapbox proceeds to direct processing to the unbranch atom 1274 that has input identifier tag 1278 that matches the output identifier tag 1289 in the transform atom 1260.

Alternatively to processing the document received by the mapbox using an included map scenario (by directing processing to the include atom 1250) or transforming the document received (by directing processing to the transform atom 1260), the mapbox may direct processing from the branch atom 1240 directly to the unbranch atom 1270. The mapbox so directs processing based on a match of the output identifier tag 1249 in the branch atom 1240 with the input identifier tag 1279 of the unbranch atom 1270. In this manner, the document received may be routed to the output of the mapbox without undergoing any data transformation. Such routing may be useful, for instance, when a invalid document has been received.

The data converter information 1220 includes conversion rules to convert data for a map scenario to an XML document when the data is otherwise formatted (e.g., data formatted as a comma-delimited file). The conversion rules may be included in an executable program developed, for example, in Java Visual Basic (VB), Javascript, or VBscript.

FIG. 13 shows an example representation in XML of a transform atom 1300. The transform atom 1300 includes a header 1310 that includes a name 1312, a description 1314, and a header wrapper 1310W that denotes a closing delimiter for the transform atom 1300. As described in FIG. 12, the name 1312 and description 1314 may provide internal documentation and help to distinguish a particular functional atom from other functional atoms. The transform atom 1300 also includes an input identifier 1320 and an output identifier tag 1325 that are the means by which functional atoms are interlinked to form a data and process flow, as described in FIG. 12.

The transform atom 1300 includes rule information 1330. The rule information 1330 may include the data transformation rules themselves. This may be referred to as in-line transformation. Additionally or alternatively, the rule information 1330 may point to another document that includes the data transformation rules to be applied. Here, rule information 1330 points to an XSLT stylesheet that includes data transformation rules to be applied. The use of a separated transformation document may be useful. For example, the transformation rules may be used in a different map scenario or elsewhere in the same map scenario. The separation of the data transformation rules from the transform atom in the map scenario reduces the size and cognitive complexity of the transform atom and the map scenario. This may help reduce the time and cost of the construction and maintenance of the application integration software by increasing the comprehensibility of the map scenario.

FIG. 14 depicts an example representation in XML of a split atom 1400. The split atom 1400 includes a header 1410 that includes a name 1412, a description 1414, and a header wrapper 1410W that denotes a closing delimiter for the split atom. As described in FIG. 12, the name 1412 and description 1414 may provide internal documentation and help to distinguish a particular functional atom from other functional atoms. The split atom 1400 also includes an input identifier 1420 and an output identifier tag 1425 that are the means by which functional atoms are interlinked to form a data and process flow, as described in FIG. 12.

The output identifier of the split atom 1400 includes an "xpath" expression that is applied to the input document. The expression splits the input document into zero or more separate documents. The expression is an array of elements that identifies the root of each document produced by the split atom.

FIG. 15 depicts an example representation in XML of a branch atom 1500. The branch atom 1500 includes a header 1510 that includes a name 1512, a description 1514, and a header delimiter 1510W that denotes a closing delimiter for the branch atom. As described in FIG. 12, the name 1512 and description 1514 may provide internal documentation and help to distinguish a particular functional atom from other functional atoms. The branch atom 1500 also includes an input identifier 1520 and output identifier tags 1525, 1526, and 1527 that are the means by which functional atoms are interlinked to form a data and process flow, as described in FIG. 12.

The output identifiers 1525 and 1526 of the branch atom 1500 each include an expression (here, an "xpath" expression) that detects whether a particular process should be performed for all or a portion of the document received by the branch atom 1500.

The output identifier 1527 is used to specify the processing that will be performed (for example, the functional atom that will next be invoked by the mapbox) when neither the condition identified by the expression identified by output identifier 1525 or the condition identified by the expression identified by output identifier 1526 is not fulfilled. This may be referred to as an "otherwise exit" or default processing.

FIG. 16 depicts an example representation in XML of a validate atom 1600. The validate atom 1600 includes a header 1610 that includes a name 1612, a description 1614, and a header wrapper 1610W that denotes a closing delimiter for the validate atom. As described in FIG. 12, the name 1612 and description 1614 may provide internal documentation and help to distinguish a particular functional atom from other functional atoms. The validate atom 1600 also includes an input identifier 1620, output identifiers 1625 and 1630 that are the means by which functional atoms are interlinked to form a data and process flow, as described in FIG. 12.

The validate atom 1600 includes schema information 1640. Schema information 1640 identifies an XML schema definition document (for example, a W3C schema or a XSD schema) that is to be applied to the document received by the validate atom to determine whether the document fulfills the rules included in the XML schema definition. Additionally or alternatively, schema information may include the schema information directly in the validate atom 1600 in contrast to a reference to a schema definition document.

The output identifiers 1625 and 1630 identify two mutually exclusive processing paths that are executed based on whether or not the validation against the schema information was successful. When the document does not fulfill the rules (for example, a validation error occurs), the output identifier 1630 is executed. Typically, the data and a tag in the output document contains the results of the validation that has happened.

The validation results may be used by the developer or other user for to monitor the map scenario processing. The validation results also may be used by the developer or other user for problem solving. For example, during development of a map scenario, validation atom 1600 may be used in order to check the correctness of a received document before further processing. The validation atom 1600 also may be used immediately before the final output of the map scenario from the mapbox to check the correctness of the output document.

Figure 17:
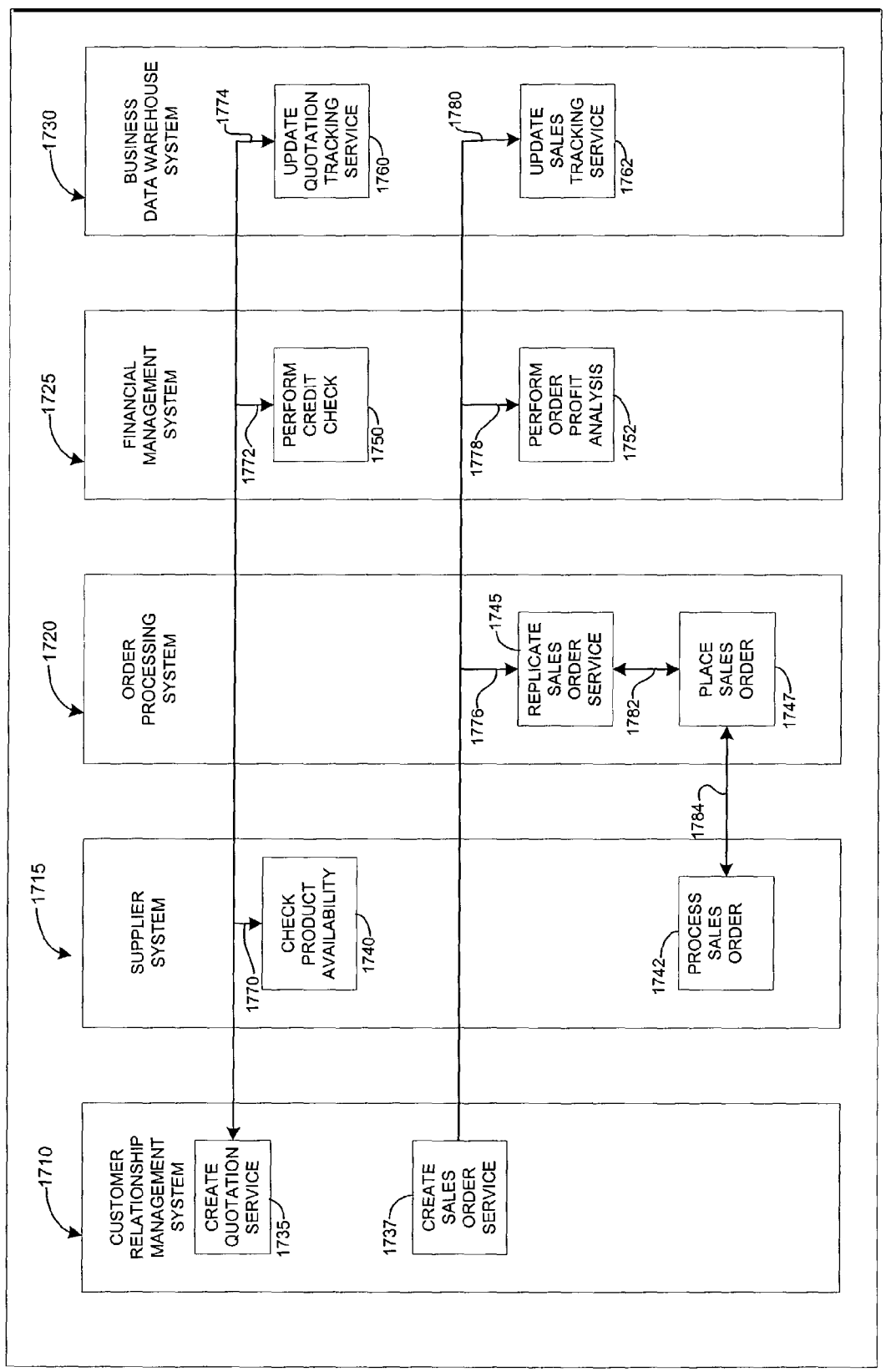
FIGS. 17–18 are diagrams of example user interfaces for an application integration workstation.
Figure 18:
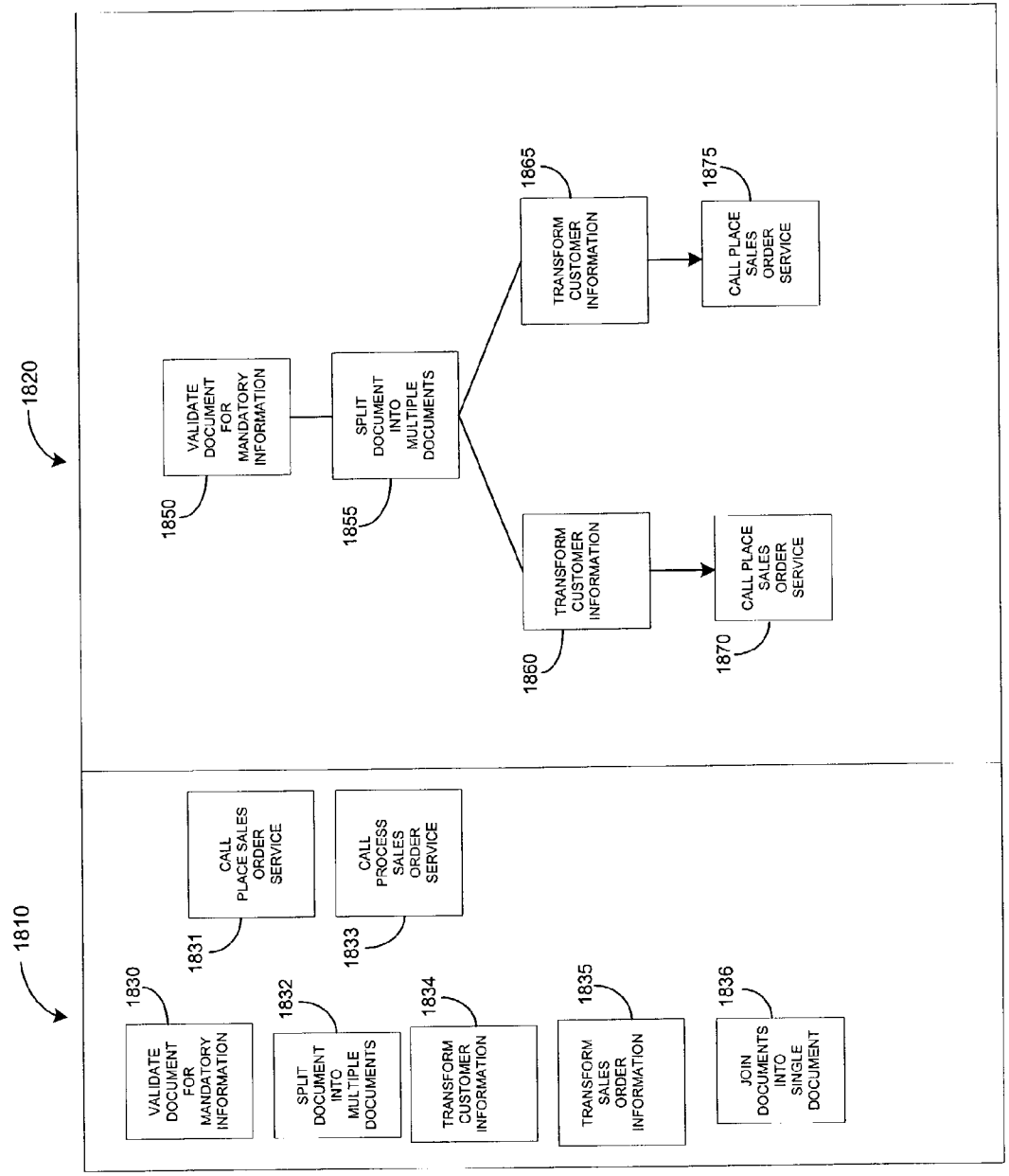

FIGS. 17–18 depict an example of a user interface for visually modeling application integration software. FIG. 17 presents a business process flow 1700 including a CRM system 1710, a supplier system 1715, a order processing system 1720, a financial management system 1725, and a business data warehouse system 1730. The systems presented in the business process flow 1700 may be controlled by the same or different corporate entities. For example, one corporate entity may control the CRM system 1710, the order processing system 1720, a financial management system 1725, and a business data warehouse system 1730. A different corporate entity may control the supplier system 1715. Each system is represented in the business process flow 1700 as a rectangle with text identifying the system. The one or more services that are available from that system are listed in the user interface. Here, each service is represented as a box that appears within the borders of the system rectangle. The CRM system 1710 includes a create quotation service 1735 and a create sales order service 1737. The supplier system includes a check product availability service 1740 and a process sales order service 1742. The order processing system 1720 includes a replicate sales order service 1745 and a place sales order service 1747. The financial management system 1725 includes a perform credit check service 1750 and a perform order profit analysis service 1752. The business data warehouse 1730 includes an update quotation tracking service 1760 and a update sales tracking service 1762.

The developer or other user may insert or delete systems from the presented business process flow 1700. Similarly, the developer or other user may insert or delete services from systems in the presented business process flow 1700. The developer or other user connects a particular service with one or more services in the integration landscape. In the business process flow 1700 a line drawn between two service boxes indicate a service connection. The business process flow 1700 includes service connections 1770, 1772, 1774, 1776, 1778, 1780, 1782, and 1784. The developer or other user may indicate an integration design pattern flow for one or more service connections in the business process flow 1700, as described in FIG. 18.

Referring also to FIG. 18, a developer or other user may indicate an integration design pattern flow for service connections 1776 and 1782. Service connection 1776 represents the data exchange between the create sales order service 1737 in the CRM system 1710 with the replicate sales order service 1745 in the order processing system 1720. Service connection 1782 represents the data exchange between the replicate sales order service 1745 and the place sales order service 1747, both of which are in the order processing system 1720.

FIG. 18 depicts an example of a user interface 1800 that may be used by a developer or other user to create and modify an integration design pattern flow. A user may design a conceptual data and process flow using integration design pattern building-blocks that indicate the data transformation needed to accomplish the data exchange required in one or more service connections.

The user interface 1800 includes windows 1810 and 1820. The user interface 1800 includes a window 1810 that includes set of integration design patterns 1830–1836. Each integration design pattern is represented as a box within window 1810. For brevity, only a few illustrative integration design patterns are included in window 1810. Window 1810 also may be referred to as a palette of integration design patterns. A user may select a particular integration design pattern from window 1810 for use in the integration design pattern flow presented in window 1820. For example, the user may double-click on a particular integration design pattern from the set of integration design patterns 1830–1836. The user may drag-and-drop the selected integration design pattern into window 1820. The user may indicate the position in which the selected integration design pattern should be inserted into the integration design pattern flow in window 1820. The user may connect one or more integration design patterns together in window 1820.

Here, a particular integration design pattern flow produced by a user is depicted. The integration design pattern flow in window 1820 includes the integration design patterns 1850, 1855, 1860, 1865, 1870, and 1875. The integration design patterns are connected into a flow using lines. The flow begins with integration design pattern 1850 that indicates the input document should be validated to ensure that all mandatory information is present. The flow indicates that the document then is split into multiple documents (as indicated by integration design pattern 1855). The integration design pattern flow indicates that customer information on each of the documents should be transformed (as indicated by integration design patterns 1860 and 1865). Each transformed document may be provided to different sales vendors. The integration design pattern flow indicates that the flow is competed with calls to the place sales order service (as indicated by integration design patterns 1870 and 1875).

Figure 19:
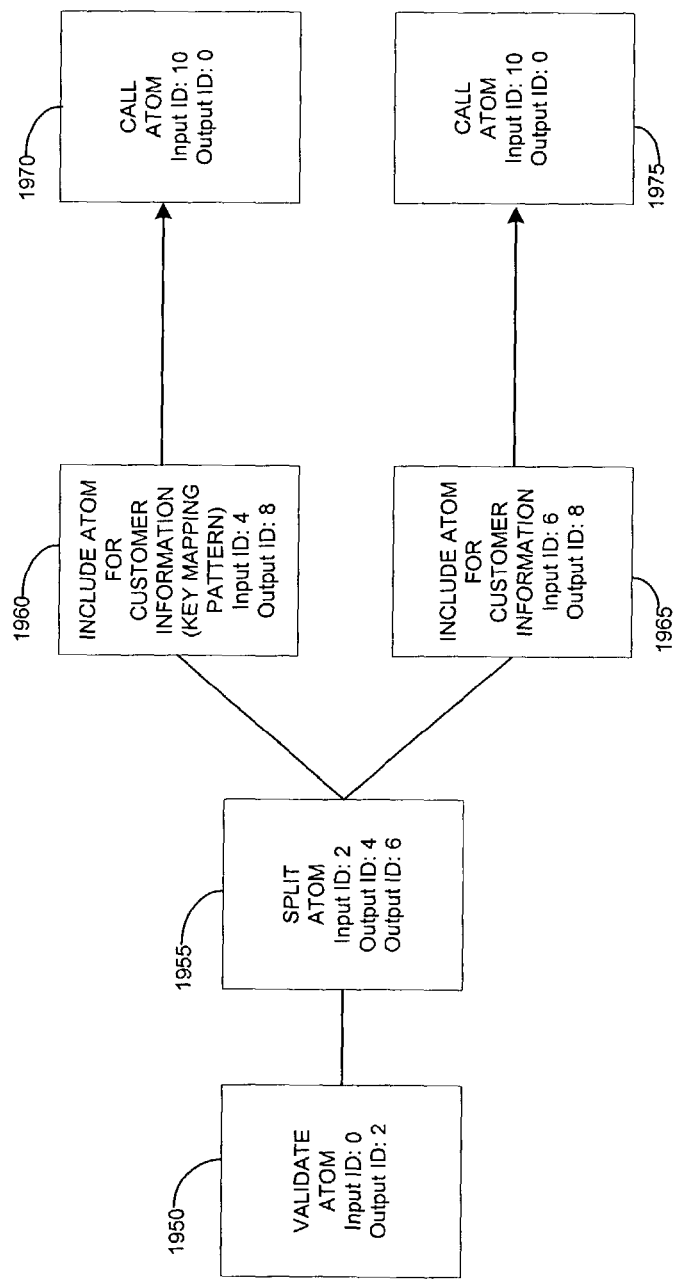
FIG. 19 is a diagram of functional atoms that may be generated by an application integration workstation that generates the interface of FIG. 18.

FIG. 19 depicts the functional atoms that may be generated by the application integration workstation for the integration design pattern flow presented in window 1820 in FIG. 18. The generation of functional atoms from a integration design pattern has been described in FIGS. 3 and 4. Functional atoms and functional atom templates have been described previously in FIGS. 5–7 and 12–16.

A validate atom 1950 is generated based on integration design pattern 1850. A split atom 1955 is generated based on integration design pattern 1855. An include atom 1960 is generated based on integration design pattern 1860. The include atom 1960 may include more than one functional atoms, such as a validate atom to validate customer information, a transform atom to perform key mapping for customer information, and a transform atom to perform additional data value transformations, such as simple table lookup or one-to-one data value transformations. Similarly, an include atom 1965 is generated based on integration design pattern 1865 to transform customer information and, like include atom 1960, may include more than one functional atoms to perform the functions related to integration design pattern 1865. The call atom 1970 is generated based on integration design pattern 1870, and the call atom 1975 is generated based on integration design pattern 1875.

Figure 20:
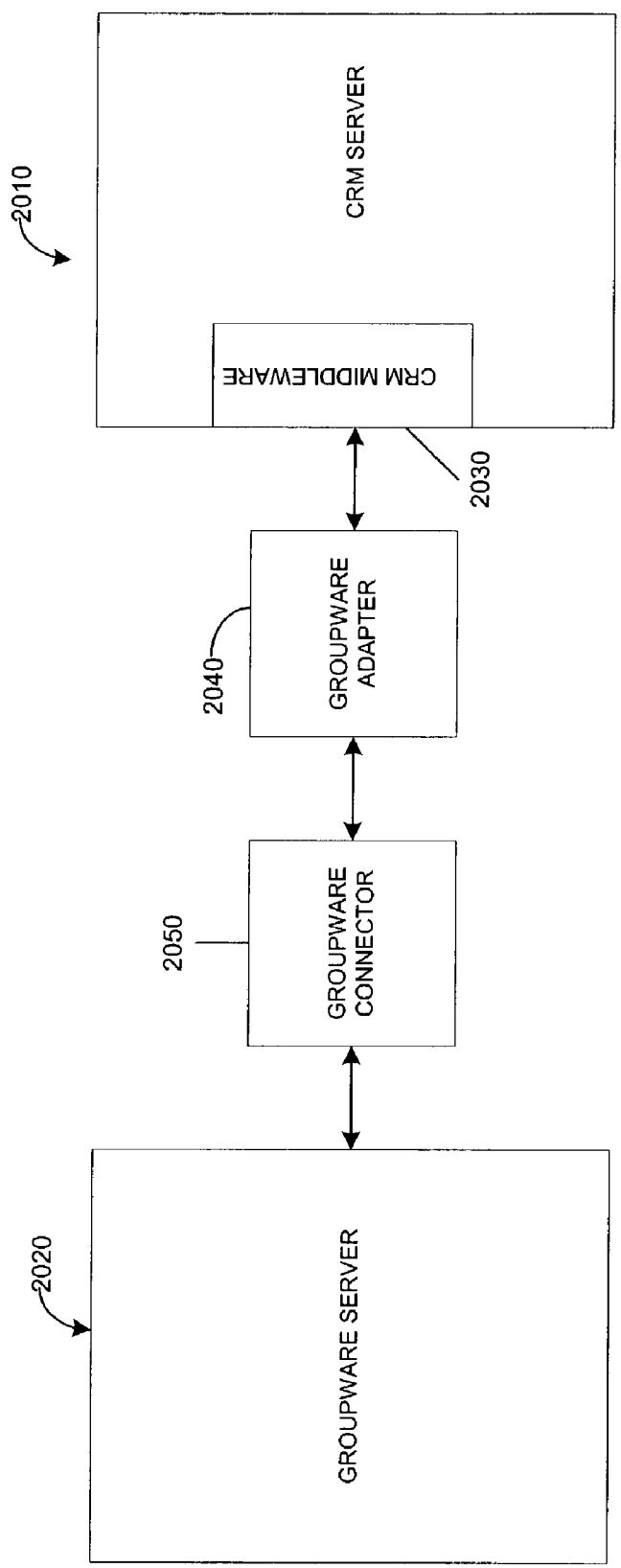
FIGS. 20–21 are diagrams of the components of software architectures for application integration software that exchanges data with a groupware system.
Figure 21:
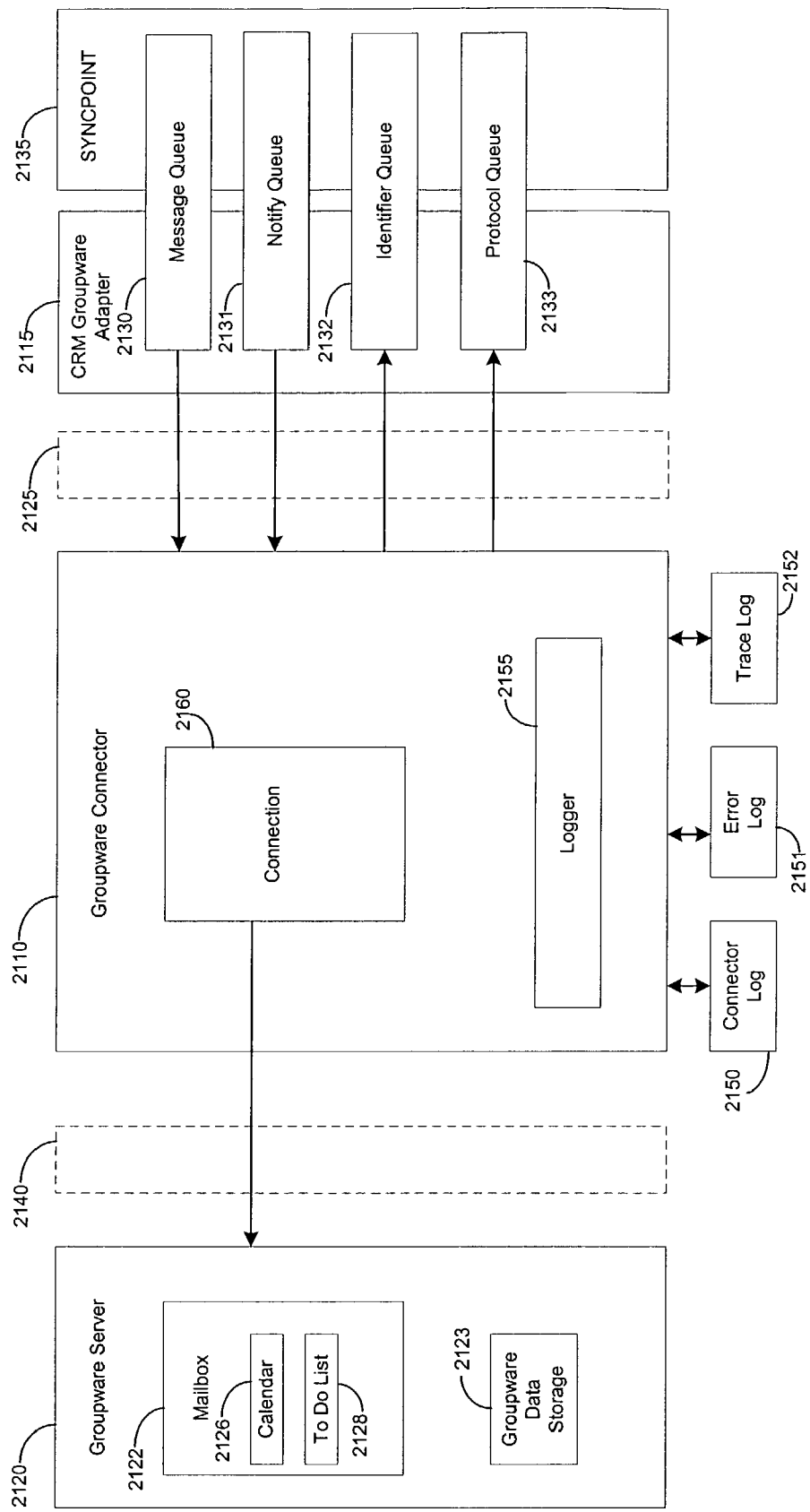

FIGS. 20–21 illustrate particular implementations of a mapbox, such as the mapbox described in FIGS. 9–10. In FIGS. 20–21 a CRM system exchanges data with a groupware system, through a groupware server, to provide the groupware system with contact, appointment, and/or task information (groupware data) from the CRM system. Examples of a groupware server include a Microsoft Exchange Server by Microsoft Corporation of Redmond, Wash. and a Lotus Domino Groupware Server by IBM Corporation of White Plains, N.Y.

FIG. 20 depicts a CRM server 2010 providing data to a groupware server 2020. The CRM server 2010 includes CRM middleware 2030. The CRM middleware 2030 directs data exchange messages between the CRM server and other systems (not shown), including the groupware server 2020. In general, the CRM middleware 2030 uses different types of message structures to communicate different data structures. The CRM middleware 2030 sends a message that includes groupware data from the CRM server 2010 to groupware adapter 2040. The groupware adapter 2040 receives the message from the CRM middleware 2030. The groupware adapter 2040 transforms the groupware data into an intermediate groupware format and sends the message to the groupware connector 2050. For example, the groupware adapter 2040 may receive CRM data for a customer or other business partner. The groupware adapter 2040 may transform the customer data into an intermediate groupware contact format (such as vCard, a format for transporting groupware contact information). Similarly, the groupware adapter 2040 may receive CRM data for an activity or other resource management data. The groupware adapter 2040 may transform the activity data into an intermediate groupware calendar format (such as iCal, a format for transporting groupware calendar information).

The groupware connector 2050 receives the message from the groupware adapter 2040 and transforms the data from the intermediate groupware format to a format that is understandable by groupware server 2020. For example, if the groupware server is a Microsoft Exchange server, the groupware connector 2050 transforms the groupware data into a format readable by a Microsoft Exchange groupware server. Similarly, if the groupware server is a Lotus Domino server, the groupware connector 2050 transforms the groupware data into a format readable by a Lotus Domino groupware server. The groupware connector 2050 then sends the transformed groupware data to groupware server 2020. The groupware server 2020 receives the transformed groupware data and updates the data stored on the groupware server 2020. For example, the groupware server 2020 may insert, for example, groupware information relating to a new contact into a groupware address book or contact list. The groupware server 2020 may insert a new task and/or a new appointment based on the transformed data received. The groupware server 2020 sends an acknowledgement message to the CRM middleware 2030 through the groupware connector 2050 and the groupware adapter 2040.

In some implementations, a groupware adapter 2040 may transform the received CRM data into a format understandable to the groupware server 2020. In such a case, the groupware connector 2050 may not be necessary.

In some cases, the groupware connector may update the groupware information stored on the groupware server 2020. For example, the groupware connector may use a remote procedure call or other type of protocol that allows a program on one computer system to execute a program on a server computer system.

Referring to FIG. 21, the groupware connector 2110 functions as a bridge between a CRM groupware adapter 2115 (such as groupware adapter 2040 in FIG. 20) in a CRM server, such as CRM server 2010 in FIG. 20. The groupware connector 2110 communicates with the groupware adapter 2115 through the use of a transfer protocol 2125 (such as the Simple Object Access Protocol (SOAP) protocol over the HTTP protocol). Messages that include data from the CRM server are sent from the groupware adapter 2115 to the groupware server 2120. A message that includes groupware data may relate to a function of the groupware running on the groupware server 2120. Examples of groupware functions include the maintenance of a calendar of appointments and meetings for a user or other entity, a task or "to do" list for a user or other entity, or an address book or contact list for a user or other entity. Typically, a message identifies one or more users to receive a message or groupware data update. The groupware server 2120 includes a mailbox for each groupware user 2122 and groupware data storage 2123. A mailbox for a groupware user includes information associated with a calendar 2126 of appointments or meetings for the user and one or more tasks in a "to do" list 2128. Groupware data storage 2124 includes documents or other data stored in the groupware server 2120. The groupware data storage 2123 may include a database and/or another data management system. For example, groupware data storage 2123 may include a collection of publicly-accessible document folders that hold groupware data.

The messages to be sent from the groupware adapter 2115 are put into one of several queues 2130–2133. Messages with CRM data to be sent to the groupware server 2120 are placed in a message queue 2130 by the syncpoint 2135. (The other queues 2131–2133 are described later.) The syncpoint 2135 may implement aspects of CRM Middleware 2030 in FIG. 20. The syncpoint 2135 may create the queues 2130–2133 used by CRM groupware adapter 2115. In some implementations, the syncpoint 2135 may include or perform the functions of a CRM groupware adapter 2040 of FIG. 20 or CRM groupware adapter 2115.

The groupware connector 2110 invokes the groupware adapter 2115 to access one or more messages in the queues 2130–2133. In some implementations, the groupware connector 2110 may include a message queue, and the syncpoint 2135 or the groupware adapter 2115 may place a message in the message queue of the groupware connector.

Each message provided by the groupware adapter 2115 includes of a header and a message body. The header may contain information specific to the CRM system. The header, for example, may include a unique CRM document identifier that may be used for subsequent item updates to the data sent in the message. The header may include a groupware item identifier that corresponds to a unique identifier for the data used by the groupware server 2120. For data to be added to the groupware data storage 2123 or one or more mailboxes 2122 on the groupware server 2120, the groupware item identifier is empty when the message including the groupware data from the CRM server is sent to the groupware server 2120. The groupware item identifier may be created when the data is inserted into the groupware server 2120 and returned to the CRM server through the groupware connector 2110, groupware adapter 2115, and syncpoint 2135 in an acknowledgement message. The groupware item identifier may help identify the data in the groupware server database during subsequent updates. In addition, some header information, such as the unique CRM document identifier and/or the groupware item identifier may be stored in a log file for the message. The log file may be used to help identify and solve problems with processing particular messages or user queues.

The header information includes an address of the recipient, such as an e-mail address. This may enable the groupware server to store information (such as appointments and tasks) in a particular user's mailbox. Some groupware servers may stored contacts in a separate database or other data storage (such as a publicly-accessible folder) that is accessible through an external simple mail transfer protocol (SMTP) e-mail address or other type of e-mail address. The e-mail address may be included in the address of the recipient in the header.

The body includes a record containing transformed groupware data from the CRM server. The groupware adapter 2115 converts the CRM server data into a groupware format, such as a common groupware format (vCard for a contact and iCal for tasks and appointments). The groupware connector 2110 transforms the received data from the common format (for example, iCal or vCard) to a format specific to Lotus Domino. The data transformations may be performed using, for example, XSLT transformations. For example, Lotus Domino uses data in the common format vCard for a contact. Similarly, the body in a message may include task or appointment data in a format readable by the groupware server 2120, such as data in the common format iCal for tasks and appointments that is readable by Lotus Domino.

The groupware connector 2110 uses a transfer protocol 2140 to connect to the groupware server 2120. When a message includes a new contact, the groupware connector 2110 opens the groupware data storage, saves the data in the data storage, and sends any document identifier associated with the saved data to the groupware adapter through an identifier queue 2132 that is described below.

When a message includes an appointment that has more than one participant, the groupware connector 2110 stores a message in the calendar of the person identified as organizing the appointment and a meeting request is sent to the mailbox of all other participants.

When a message includes data to be updated in the groupware server 2120, the connector opens a document, updates the fields and saves the document back to the groupware data storage 2123. When the message includes data to be updated in the groupware server 2120 and the data to be updated is not found in the groupware data storage 2123, the groupware connector 2110 may create and save a new document with the data. When a message requires the deletion of an original item in the groupware server 2120, the groupware connector 2110 opens a document and deletes it.

When a message is successfully processed, the groupware connector 2110 sends a confirmation or acknowledgement message to the groupware adapter 2115. The groupware adapter 2115 then may delete the message from the queue.

The groupware connector 2110 includes error logs 2150–2152 that are processed by a logging process (or logger) 2155. The groupware connector 2210 includes a connection 2160 for processing messages of users. In some implementations, a connection pool that includes a set of threads or connections may be used. The messages for different users may be processed in parallel using different threads in the connection pool. The message queue for a single user is always processed in a single thread. The amount of threads used to transfer data may be user definable.

The groupware connector 2110 uses a set of queues 2131–2133 to communicate with the groupware adapter 2115. The notify queue 2131 is an inbound queue that includes information about data availability in other queues. The identifier queue 2132 is an outbound queue that includes information about the groupware unique identifiers for newly written documents. The groupware connector 2110 posts information to the identifier queue 2132. The protocol queue 2133 includes information about errors that have occurred.

Advantages may be found when the computing environment of the groupware connector 2110 is compatible with the computing environment of the groupware server 2120 with which the groupware connector is to communicate. For example, when communicating with a Lotus Domino groupware server, a groupware connector developed using the Java programming language may be beneficial. The groupware connector 2110 may use a transfer protocol 2140 that uses a Lotus Java/COBRA application programming interface (API) to send data to and receive data from the Lotus Domino groupware server. Similarly, when communicating with a Microsoft Exchange Server, a groupware connector developed using the C++ programming language may be useful. The groupware connector 2110 may use a transfer protocol 2140 that uses a common document object (CDO) protocol may be used to send data to and receive data from the Microsoft Exchange Server.

Although FIGS. 20–21 illustrate a one-way data exchange from a CRM system to a groupware system, the illustrated techniques may be applicable to a two-directional data exchange (for example, the groupware system also may provide data to the CRM system). The techniques also may be applicable to the exchange of data types other than the illustrated contact, appointment, and task information.

Implementations may include a method or process, an apparatus or system, or computer software on a computer medium. It will be understood that various modifications may be made. For example, advantageous results still could be achieved if steps of the disclosed techniques were performed in a different order and/or if components in the disclosed systems were combined in a different manner and/or replaced or supplemented by other components.

The benefits from the described application integration techniques are not limited to the illustrated implementations. For example, some implementations may different data management systems, data structures, or system configurations.

Some implementations may store data for the application in an object-oriented database that physically organizes data into a series of objects, a relational database, or another type of data management system. A relational database may logically organize data into a series of database tables, each of which may arrange data associated with an entity in a series of columns and rows. Each column may describe an attribute of the entity for which data is being stored, while each row may represent a collection of attribute values for a particular entity.

What is claimed is:

1. A computer-implemented method of designing integration software, the method comprising:
   specifying a service connection over which a data transfer between different application software systems is to occur, wherein:
   each of the application software systems includes a database capable of storing data related to business transactions and instructions that, when executed, cause data related to the business transactions to be processed, and
   the service-connection specifying including:
      receiving, at a computer workstation, user input indicating a selection, from a repository accessible by the workstation that identifies a landscape of possible application software systems that may be selected, of a first service and associated application software system to be involved in the data transfer; and
      receiving, at the workstation, user input indicating a selection, from the repository, of a second service and associated application software system to be involved in the data transfer;
   specifying an integration design that accomplishes the data transfer between the application software systems and that is made up of at least one integration design pattern, the integration-design specifying including;
      receiving user input indicating a selection, from a repository that identifies a set of processes used in data transfers, of integration design patterns needed to accomplish the specified data transfer between the application software systems via the specified service connection; and
      receiving user input that specifies a sequence by which the selected integration design patterns are to be performed; and
   generating software code that controls the data transfer via the specified service connection and performs the selected integration design patterns in the specified sequence.

2. The method of claim 1 further comprising associating at least one portion of the generated software code with at least one portion of the integration design, each particular portion of the generated software code being associated with a particular portion of the integration design.

3. The method of claim 2 further comprising:
   receiving a second user input that identifies a portion of the integration design to be displayed; and
   displaying a portion of the generated software code that is associated with the portion of the integration design identified by the second user input.

4. The method of claim 3 further comprising modifying the displayed portion of the generated software code.

5. The method of claim 1 wherein the generated software code comprises a generated executable instructions.

6. The method of claim 1 wherein the generated software code comprises a generated template for integration software.

7. The method of claim 1 wherein the at least one integration design pattern includes at least one of a pattern for validating a data collection for mandatory information, a pattern for splitting data from one data collection into separate data collections, a pattern for invoking a key mapping function, a pattern for invoking a data transformation function, a pattern for invoking a connectivity function for a particular application system, and a pattern for invoking connectivity function for invoking a particular service.

8. The system of claim 1 wherein the at least one integration design pattern decomposes into at least two integration design patterns.

9. The method of claim 1 wherein the at least one integration design pattern comprises at least one functional atom that describes at least one of a data processing functional atom, a data persistency functional atom, or a helper functional atom.

10. The method of claim 9 wherein the data processing functional atom describes at least one of a transformation functional atom, a branch functional atom, an unbranch functional atom, a split functional atom, or a join functional atom.

11. The method of claim 10, wherein the functional atom comprises a transformation on functional atom, further comprising:
    receiving a data collection and a data transformation rule;
    transforming the received data collection by applying the data transformation rule to the received data collection; and
    producing a transformed data collection.

12. The method of claim 11 wherein the data transformation rule comprises a complex transformation rule having multiple transformation components.

13. The method of claim 10 wherein the functional atom comprises a branch functional atom further comprising:
    receiving a data collection;
    transforming the received data collection based in data values within the received data collection; and
    producing at least one data collection based on the received data collection.

14. The method of claim 10 wherein the functional atom comprises a unbranch functional atom, further comprising:
    receiving two or more data collections; and
    producing a data collection based on the two or more data collections received.

15. The method of claim 10 wherein the functional atom comprises a split functional atom, further comprising:
    receiving a data collection;
    transforming the received data collection based on receiving data within the received data collection; and
    producing two or more data collections based on the received data collection.

16. The method of claim 10 wherein the functional atom comprises a join functional atom, further comprising:
    receiving at least two data collections with each data collection including a particular type of data; and producing a data collection based on the two or more data collections received.

17. The method of claim 10 wherein the functional atom comprises a validate functional atom, further comprising:
receiving a data collection and a data validation rule,
validating the received data collection by applying the validation rule to the received data collection; and
producing a validation result.

18. The method of claim 17 wherein the data validation rule comprises a complex data validation rule having multiple validation components.

19. The method of claim 9 wherein the functional atom comprises a call atom, an include atom, or both a call atom and an include atom.

20. The method of claim 19, wherein the functional atom comprises a call atom, further comprising:
receiving an identification of executable software; and
executing the identified executable software.

21. The method of claim 19, wherein the functional atom comprises an include atom, further comprising:
receiving an identification of a second functional atom; and
executing the second functional atom.

22. A computer-implemented method of designing integration software, the method comprising:
specifying a service connection over which a specified data transfer between different application software systems is to occur, wherein:
each of the application software systems includes a database capable of storing data related to business transactions and instructions that, when executed, cause data related to the business transactions to be processed, and
the service-connection specifying including:
receiving, at a computer workstation, user input indicating a selection, from a repository accessible by the workstation that identifies a landscape of possible application software systems that may be selected, of a first service and associated application software system to be involved in the data transfer; and
receiving, at the workstation, user input indicating a selection, from the repository, of a second service and associated application software system to be involved in the data transfer;
specifying an integration design that accomplishes the data transfer between the application software systems and that is made up of at least one integration design pattern, the integration-design specifying including:
receiving user input indicating a selection, from a repository that identifies a set of processes used in data transfers, of integration design patterns needed to accomplish the data transfer between the application software systems via the specified service connection; and
receiving user input that specifies a sequence by which the selected integration design patterns are to be performed;
generating, from the specified integration design, software code that controls the data transfer function via the specified service connection; and
associating at least one portion of the generated software code with at least one portion of the integration design, each particular portion of the generated software code being associated with a particular portion of the integration design.

23. The method of claim 22 wherein the at least one integration design pattern includes at least one of a pattern for validating a data collection for mandatory information, a pattern for splitting data from one data collection into separate data collections, a pattern for invoking a key mapping function, a pattern for invoking a data transformation function, a pattern for invoking a connectivity function for a particular application system, and a pattern for invoking a connectivity function for invoking a particular service.

24. The method of claim 22 wherein the at least one integration design pattern comprises at least one functional atom that describes at least one of a data processing functional atom, a data persistency functional atom, or a helper functional atom.

25. A computer-readable medium having embodied thereon a computer program configured to design integration software, the medium comprising at least one code segment configured to:
specify a service connection over which a data transfer between different application software systems is to occur, wherein:
each of the application software systems includes a database capable of storing data related to business transactions and instructions that, when executed, cause data related to the business transactions to be processed, and
the service-connection specifying including:
receiving, at computer workstation, user input indicating a selection, from a repository accessible by the workstation that identifies a landscape of possible application software systems that may be selected, of a first service and associated application software system to be involved in the data transfer, and
receiving, at the workstation, user input indicating a selection, from the repository, of a second service and associated application software system to be involved in the data transfer;
specify an integration design that accomplishes the data transfer, between the application software systems, and that is made up of at least one integration design pattern, the integration-design specifying including:
receiving user input indicating a selection, front a repository that identifies a set of processes used in data transfers, of integration design patterns as needed to accomplished the data transfer between the application software systems; and
receiving user input that specifies a sequence by which the selected integration design patterns are to be performed; and
generating software code that controls the data transfer via the specified service connection and performs the selected integration design patterns in the specified sequence.

26. The medium of claim 25 the at least one code segment is further configured to associate at least one portion of the generated software code with at least one portion of the integration design, each particular portion of the generated software code being associated with a particular portion of the integration design.

27. The medium of claim 25 wherein the at least one integration design pattern, includes at least one of a pattern for validating a data collection for mandatory information, a pattern for splitting data from one data collection into separate data collections, a pattern for invoking a key mapping function, a pattern for invoking a data transformation function, a pattern for invoking a connectivity function for a particular application system, and a pattern for invoking a connectivity function for invoking a particular service.

28. The medium of claim 25 wherein the at least one integration design pattern comprises at least one functional atom that describes at least one of a data processing functional atom, a data persistency functional atom, or a helper functional atom.

29. A system for designing integration software, the system comprising a processor connected to a storage device and at least one input/output device, wherein the processor is configured to:

specify a service connection over which a data transfer between different application software systems is to occur, wherein:

each of the application software systems includes a database capable of storing data related to business transactions and instructions that, when executed, cause data related to the business transactions to be processed, and the service-connection specifying including:

receiving, at a computer workstation, user input indicating a selection, from a repository accessible by the workstation that identifies a landscape of possible application software systems that may be selected, of a first service and associated application software system to be involved in the data transfer; and receiving, at the workstation, user input indicating a selection, from the repository, of a second service and associated application software system to be involved in the data transfer;

specify an integration design that accomplishes the data transfer between the application software systems and that is made up of at least one integration design pattern, the integration-design specifying including:

receiving user input indicating a selection, from a repository that identifies a set of processes used in data transfers, of integration design patterns needed to accomplish the data transfer, between the application software systems, via the specified service connection; and receiving user input that specifies a sequence by which the selected integration design patterns are to be performed; and generating software code that controls transfer via the specified service connection and performs the selected integration design patterns in the specified sequence.

30. The system of claim 29 wherein the processor is further configured to associate at least one portion of the generated software code with at least one portion of the integration design, each particular portion of the generated software code being associated with a particular portion of the integration design.

31. The system of claim 29 wherein the at least one integration design pattern includes at least one of a pattern for validating a data collection for mandatory information, a pattern for splitting data from one data collection into separate data collections, a pattern for invoking a key mapping function, a pattern for invoking a data transformation function, a pattern for invoking a connectivity function for a particular application system, and a pattern for invoking a connectivity function for invoking a particular service.

32. The system of claim 29 wherein the at least one integration design pattern comprises at least one functional atom that describes at least one of a data processing functional atom, a data persistency functional atom, or a helper functional atom.

* * * * *